US012523066B2

(12) United States Patent
Rodd et al.

(10) Patent No.: US 12,523,066 B2
(45) Date of Patent: Jan. 13, 2026

(54) MULTIPLE-ACTUATOR SYSTEM WITH COMMON LOCKING ELEMENT

(71) Applicant: Aristocrat Technologies, Inc., Las Vegas, NV (US)

(72) Inventors: Donald Rodd, Las Vegas, NV (US); Brian Goldstein, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 209 days.

(21) Appl. No.: 18/500,574

(22) Filed: Nov. 2, 2023

(65) Prior Publication Data

US 2025/0146329 A1 May 8, 2025

(51) Int. Cl.

| | |
|---|---|
| ***E05B 61/00*** | (2006.01) |
| ***E05B 59/00*** | (2006.01) |
| ***E05B 63/00*** | (2006.01) |
| ***E05B 63/14*** | (2006.01) |
| *G07F 17/32* | (2006.01) |

(52) U.S. Cl.

CPC .............. *E05B 61/00* (2013.01); *E05B 59/00* (2013.01); *E05B 63/0065* (2013.01); *E05B 63/14* (2013.01); *G07F 17/3216* (2013.01)

(58) Field of Classification Search

CPC ...... E05B 13/00; E05B 13/002; E05B 13/004; E05B 13/007; E05B 59/00; E05B 61/00; E05B 63/0065; E05B 63/14; E05B 65/466

See application file for complete search history.

(56) References Cited

U.S. PATENT DOCUMENTS

| | | | | |
|---|---|---|---|---|
| 2,130,302 | A * | 9/1938 | Henderson | E05B 65/025 292/334 |
| 3,469,874 | A * | 9/1969 | Mercurio | E05B 63/14 70/168 |
| 3,834,780 | A * | 9/1974 | McClellan | E05C 9/046 312/219 |
| 4,711,452 | A | 12/1987 | Dickinson | |
| 5,224,707 | A * | 7/1993 | Martin | E05B 39/04 70/DIG. 30 |
| 8,191,936 | B2 * | 6/2012 | Cole | E05C 9/1883 292/121 |
| 8,419,550 | B2 | 4/2013 | Anthony | |
| 8,544,967 | B2 * | 10/2013 | Fan | H05K 7/1488 312/265.4 |
| 11,514,747 | B2 * | 11/2022 | Rodriguez | G07F 17/3216 |
| 2008/0113818 | A1 * | 5/2008 | Beadell | G07F 17/32 463/46 |
| 2008/0265587 | A1 * | 10/2008 | Nakanishi | E05B 63/042 292/26 |
| 2010/0117384 | A1 * | 5/2010 | Cole | E05C 9/02 292/341.15 |
| 2017/0284126 | A1 * | 10/2017 | Decayeux | E05B 35/10 |
| 2019/0096173 | A1 * | 3/2019 | Brandau | G07F 17/3223 |
| 2022/0154493 | A1 | 5/2022 | Neudinger | |

* cited by examiner

*Primary Examiner* — Christopher J Boswell
(74) *Attorney, Agent, or Firm* — Weaver Austin Villeneuve & Sampson LLP

(57) ABSTRACT

Dual-latch mechanisms are provided that allow two (or more) latches to be simultaneously released in response to a single input received via an actuator. Also disclosed are multiple-actuator systems with common locking elements that may simultaneously lock and unlock the multiple actuators via an input or inputs provided at a centralized location.

20 Claims, 32 Drawing Sheets

MULTIPLE-ACTUATOR SYSTEM WITH COMMON LOCKING ELEMENT

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Electronic gaming machines are complex devices and are often housed within cabinets having multiple access points in the form of doors or trays that may be opened or slid out in order to access internal components, cables, connectors, etc.

SUMMARY

Disclosed herein are dual-latch mechanisms and multiple-actuator systems with common locking elements that may be particularly well-suited for use in electronic gaming machines. As indicated above, electronic gaming machines often have access panels or doors, or slide-out trays, that may be opened or slid out in order to access internal components of such devices, e.g., for maintenance or repair purposes. Such electronic gaming machines may include various latch mechanisms that may be used to secure such access panels or doors or slide-out trays in place, thereby preventing such access routes from inadvertently opening, e.g., in response to vibration or impact.

The dual-latch mechanisms discussed herein incorporate at least one pair of latches that are able to both be transitioned from a latched state to an unlatched state simultaneously responsive to a single input provided to a corresponding actuator, e.g., a button or lever. In some such dual-latch mechanisms, two pair of latches may be provided, with each pair of latches being able to be transitioned from the latched state to the unlatched state simultaneously responsive to a single corresponding input provided to a corresponding actuator. In some such implementations, both actuators may be positioned such that a single input may simultaneously actuate both actuators, thereby causing both pairs of latches to simultaneously unlatch.

Such dual-latch mechanisms may be particularly well-suited for latching doors or trays in situations in which it is desirable to provide multiple points of securement to the item being latched. For example, an access door that has a single latch point may be more vulnerable to being pried open or being twisted about the single latch point than if it were to be latched at two separate, spaced-apart locations. Moreover, such dual-latch mechanisms may also be well-suited for use in mechanisms in which multiple latch points must be released simultaneously. For example, some electronic gaming machines have a button deck, which generally refers to a ledge that contains the buttons and/or touch-screen interfaces used to provide input to the electronic gaming machine, that is mounted on glides, allowing the button deck to be slid out horizontally, like a drawer. If a single latch point is used to secure such a button deck, there is a risk that the button deck may be subjected to an off-center load during latching, e.g., by a person pushing on a corner of the button deck, which may, in turn, cause the button deck to be torqued about a vertical axis. This loading may subject the glides to bending moments that may damage the glides. If a dual-latch mechanism is used to secure such a button deck, the two latch points may be positioned such that such potential bending moments on the glides are greatly reduced, thereby reducing the potential for damage to the glides. Moreover, the simultaneous-release aspect of the dual-latch mechanisms discussed herein may also prevent staggered unlatching of secured items, thereby preventing the secured items from being released in a skewed or uneven manner.

Also disclosed herein are multiple-actuator systems with common locking elements. Such systems may, for example, be used with dual-latch mechanisms such as those discussed above, but may also be used with other mechanical devices internal to a gaming machine that may require actuation from the exterior of the gaming machine.

Such multiple-actuator systems with common locking elements may provide a plurality of movable actuators that may be mounted within a housing and have portions that are accessible from the exterior of the housing and that may be pushed on, e.g., by a human operator, from outside of the housing. Such systems may also include a common locking element that is internal to the housing and that may be moved between at least two configurations. In one such configuration, the movable actuators may be able to move, whereas in the other configuration, they may be prevented from moving. The system may also include one or more locks, e.g., cam locks, that may be configured to cause the common locking element to move between the two configurations when transitioned from a locked state to an unlocked state. Such systems may provide a single hub that collocates multiple movable actuators for actuating multiple different mechanical systems in the interior of a gaming machine (or other device) together and allows for a single, common locking element to simultaneously lock or unlock all such movable actuators.

Both the dual-latch mechanisms and the multiple-actuator systems with common locking elements are discussed herein. The dual-latch mechanisms are discussed first, with discussion of the multiple-actuator systems with common locking elements discussed afterwards.

In some implementations, an apparatus may be provided that includes a support bracket, a plurality of rotary latches, and a first common actuator bar. Each rotary latch may be mounted to the support bracket, have a corresponding trigger that is movable between an untriggered state and a triggered state, and have one or more latching members that are movable between a latched position and an unlatched position. Each rotary latch may be configured such that the corresponding trigger obstructs movement of the one or more latching members of that rotary latch from the latched position to the unlatched position when the corresponding trigger of that rotary latch is in the untriggered state and the one or more latching members of that rotary latch are in the latched position, and enables movement of the one or more latch members of that rotary latch from the latched position to the unlatched position when the corresponding trigger of that rotary latch is in the triggered state and the one or more latching members of that rotary latch are in the latched position. The plurality of rotary latches may include at least a first rotary latch and a second rotary latch. The first common actuator bar may be secured to the support bracket such that the first common actuator bar is translatable along a first axis relative to the support bracket and configured to be translatable between a first position relative to the support bracket and a second position relative to the support bracket. The first common actuator bar and the first and second rotary latches may be configured such that the first common actuator bar, in moving from the first position to the second position, exerts a lateral force on the triggers of the first and second rotary latches, thereby causing the triggers of the first and second rotary latches to transition from the untriggered state to the triggered state.

In some such implementations, the apparatus may further include a first actuator. The first actuator may be movably mounted to the support bracket such that the first actuator is movable between a first actuation position relative to the support bracket and a second actuation position relative to the support bracket. The first actuator may also be kinematically linked to the first common actuator bar such that the first common actuator bar moves from the first position to the second position responsive to the first actuator being moved from the first actuation position to the second actuation position and such that the first common actuator bar moves from the second position to the first position responsive to the first actuator being moved from the second actuation position to the first actuation position.

In some such implementations, the first actuator may be constrained to move along a second axis relative to the support bracket. In some further such implementations, the second axis may be perpendicular to a first reference plane that is parallel to the first axis.

In some implementations, the apparatus may further include a first sliding member that is secured to the support bracket such that the first sliding member is translatable along a third axis relative to the support bracket, a first driving link having a first end and an opposing second end, and a first driven link having a first end and an opposing second end. The first end of the first driving link may be rotatably connected with the first actuator, the second end of the first driving link may be rotatably connected with the first sliding member, the first end of the first driven link may be rotatably connected with the first sliding member, and the second end of the first driven link may be rotatably connected with the first common actuator bar.

In some such implementations, the third axis may be perpendicular to a second reference plane that is parallel to the first axis. In some further such implementations, the second axis may be at an oblique angle to the second reference plane.

In some implementations, the first driving link may be rotatable relative to the first actuator and about a first rotational axis that is parallel to the first axis, and the first driven link may be rotatable relative to the first sliding member and about a second rotational axis that is a) parallel to a plane that is parallel to the first axis and b) perpendicular to another plane that is parallel to both the first axis and the third axis.

In some implementations, the apparatus may further include a second common actuator bar, the plurality of rotary latches may further include at least a third rotary latch and a fourth rotary latch, the second common actuator bar may be secured to the support bracket such that the second common actuator bar is translatable along a fourth axis relative to the support bracket, the second common actuator bar may be configured to be translatable between a third position relative to the support bracket and a fourth position relative to the support bracket, and the second common actuator bar and the third and fourth rotary latches may be configured such that the second common actuator bar, in moving from the third position to the fourth position, exerts a lateral force on the triggers of the third and fourth rotary latches, thereby causing the triggers of the third and fourth rotary latches to transition from the untriggered state to the triggered state.

In some implementations of the apparatus, the apparatus may further include a second actuator. The second actuator may be movably mounted to the support bracket such that the second actuator is movable between a third actuation position relative to the support bracket and a fourth actuation position relative to the support bracket. The second actuator may also be kinematically linked to the second common actuator bar such that the second common actuator bar moves from the third position to the fourth position responsive to the second actuator being moved from the third actuation position to the fourth actuation position, and such that the second common actuator bar moves from the fourth position to the third position responsive to the second actuator being moved from the fourth actuation position to the third actuation position.

In some such implementations, the second actuator may be constrained to move along a fifth axis relative to the support bracket. In some further such implementations, the fifth axis may be perpendicular to a fourth reference plane that is parallel to the fourth axis.

In some implementations, the apparatus may further include a second sliding member secured to the support bracket such that the second sliding member is translatable along a sixth axis relative to the support bracket, a second driving link having a first end and an opposing second end, and a second driven link having a first end and an opposing second end. The first end of the second driving link may be rotatably connected with the second actuator, the second end of the second driving link may be rotatably connected with the second sliding member, the first end of the second driven link may be rotatably connected with the second sliding member, and the second end of the second driven link may be rotatably connected with the second common actuator bar.

In some such implementations, the sixth axis may be perpendicular to a fifth reference plane that is parallel to the fourth axis. In some further such implementations, the fifth axis may be at an oblique angle to the fifth reference plane.

In some implementations of the apparatus, the second driving link may be rotatable relative to the second actuator and about a third rotational axis that is parallel to the fourth axis, and the second driven link may be rotatable relative to the second sliding member and about a fourth rotational axis that is a) parallel to a fifth reference plane that is parallel to the fourth axis and b) perpendicular to a sixth reference plane that is parallel to both the fourth axis and the sixth axis.

In some implementations of the apparatus, the first actuator may be adjacent to the second actuator. In some other such implementations, the first actuator may be adjacent to the second actuator and the second axis may be parallel to the fifth axis.

In some implementations, the apparatus may further include a gaming machine cabinet having a door and a sliding tray. The door may include a first latch strike and a second latch strike, and the sliding tray may include a third latch strike and a fourth latch strike. The door may be movable between an open configuration and a closed configuration, and the sliding tray may be movable between an extended position and a retracted position. The support bracket may be positioned within the gaming machine cabinet such that, when the door is in the closed configuration and the sliding tray is in the retracted position, the first latch strike engages with, and is secured by, the first rotary latch, the second latch strike engages with, and is secured by, the second rotary latch, the third latch strike engages with, and is secured by, the third rotary latch, and the fourth latch strike engages with, and is secured by, the fourth rotary latch.

In some implementations, the apparatus may further include a gaming machine cabinet having a door. The door may include a first latch strike and a second latch strike and be movable between an open configuration and a closed configuration. The support bracket may be positioned within the gaming machine cabinet such that, when the door is in the closed configuration, the first latch strike engages with, and is secured by, the first rotary latch and the second latch strike engages with, and is secured by, the second rotary latch.

The Figures are provided for the purpose of providing examples and clarity regarding various aspects of this disclosure and are not intended to be limiting.

DETAILED DESCRIPTION

The following discussion provides overall context for electronic gaming machines, some of which may include dual-latch mechanisms such as those discussed later herein starting with FIG. 4 or multiple-actuator systems such as those discussed later herein starting with FIG. 20.

Figure 1:
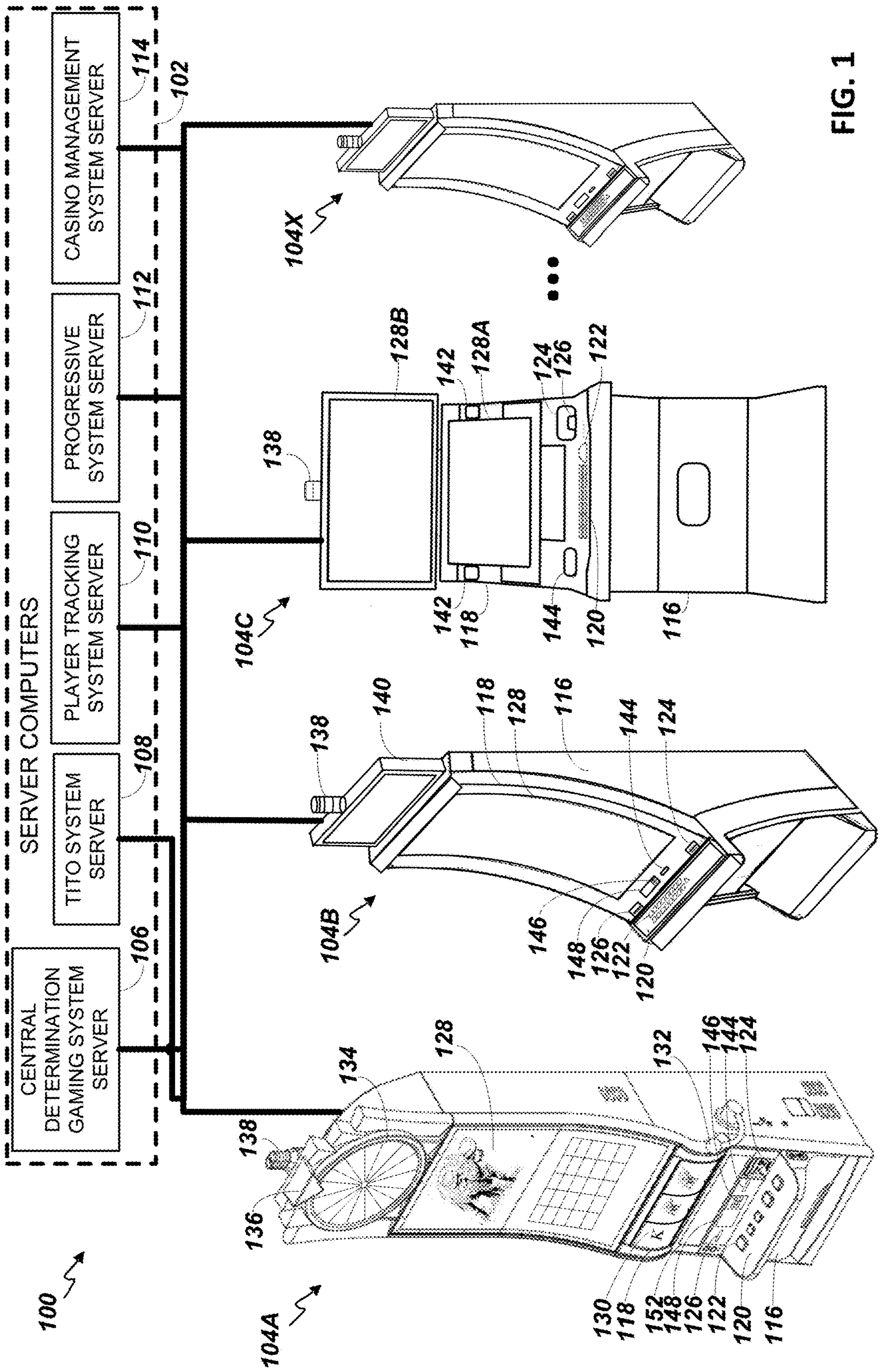
FIG. 1 is an exemplary diagram showing several EGMs networked with various gaming-related servers.

FIG. 1 illustrates several different models of EGMs which may be networked to various gaming-related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
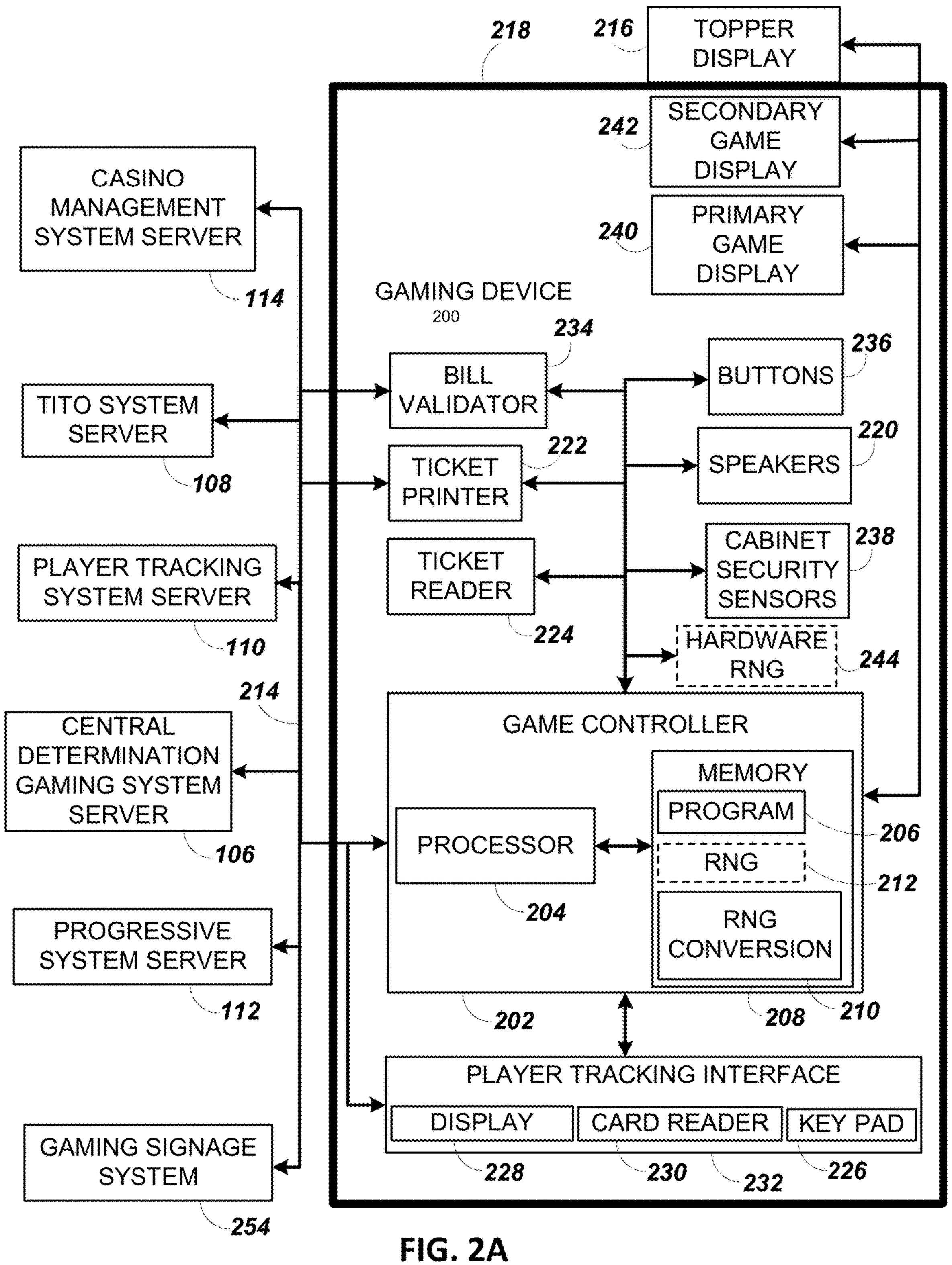
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
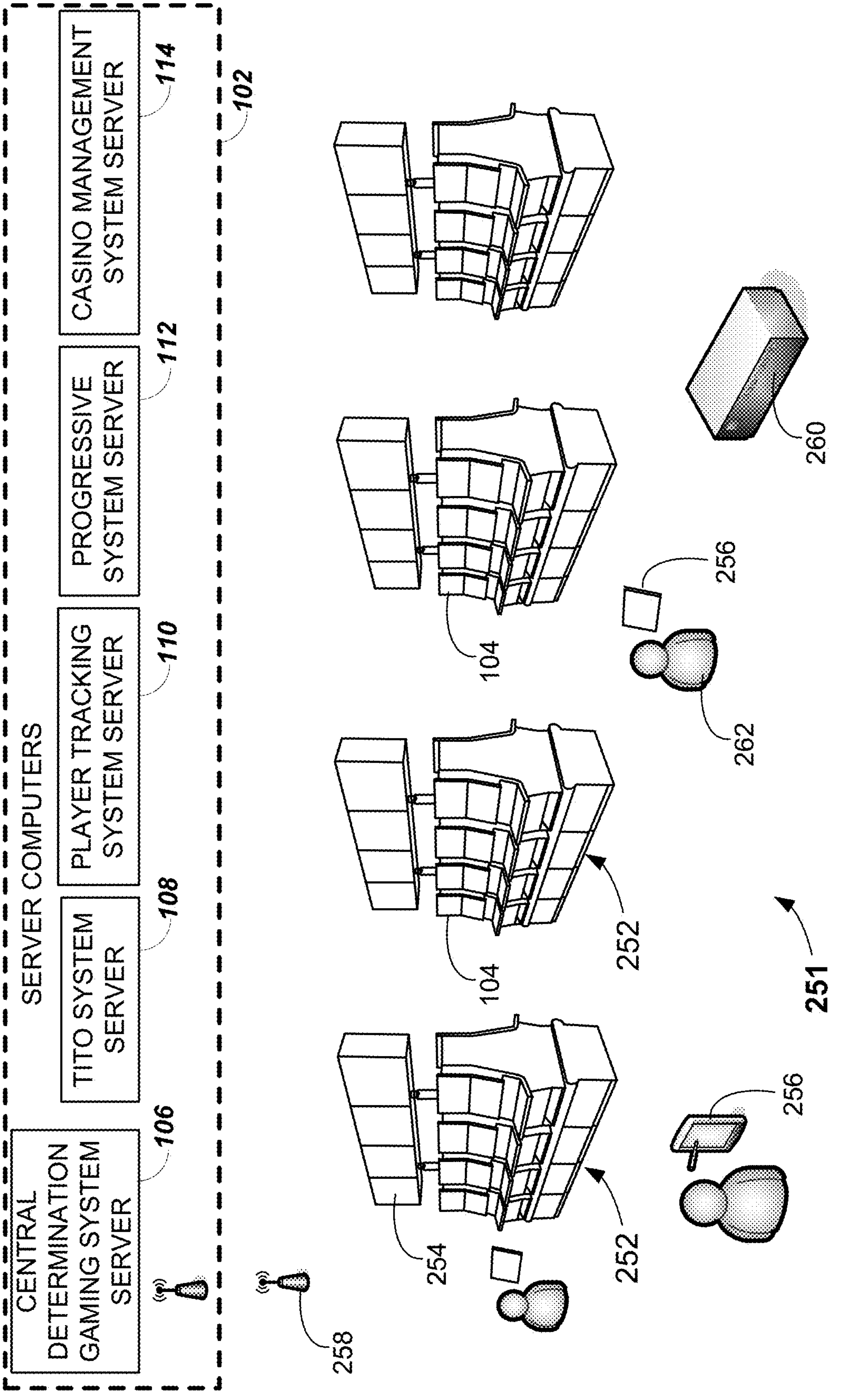
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices

256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
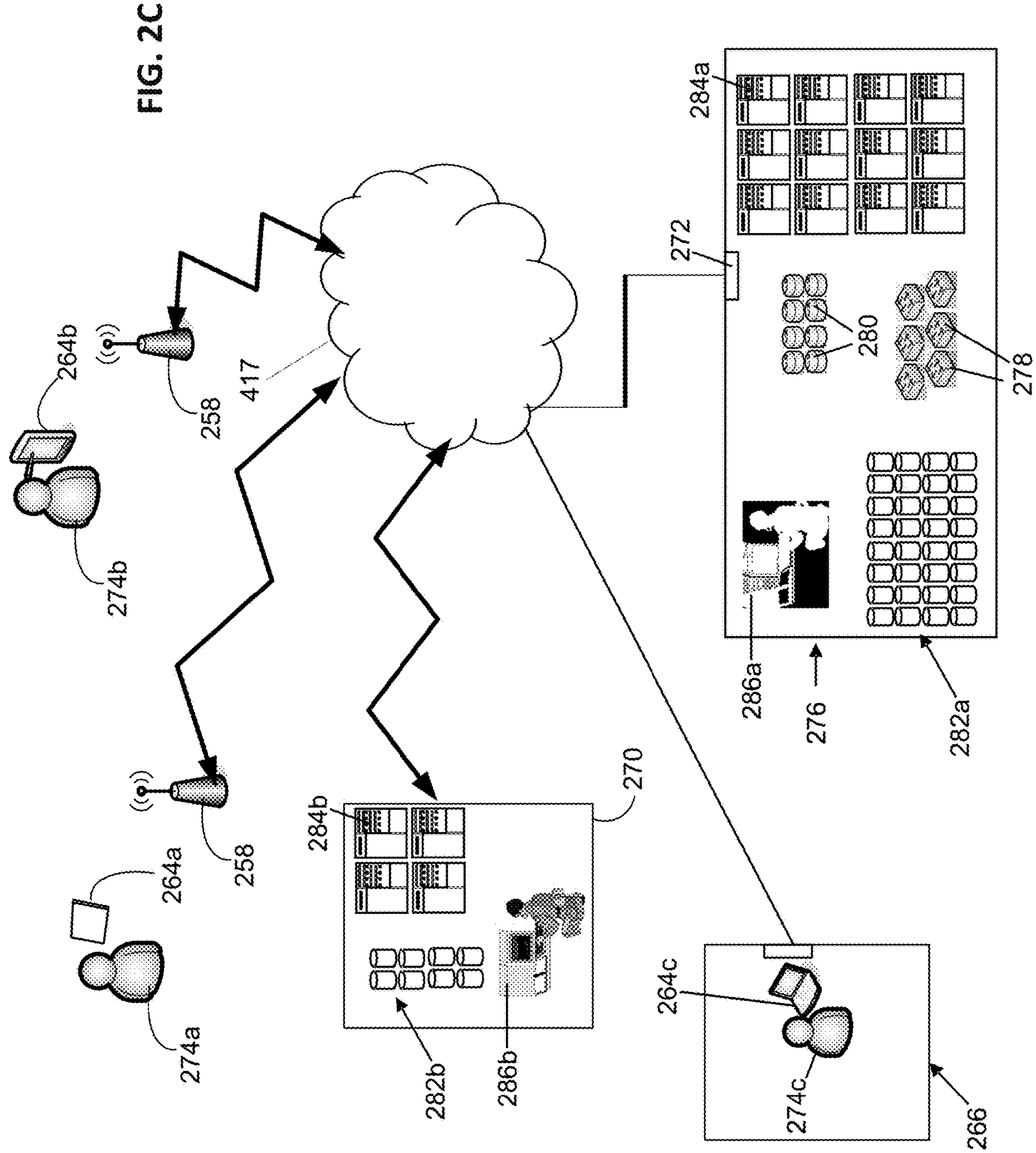
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
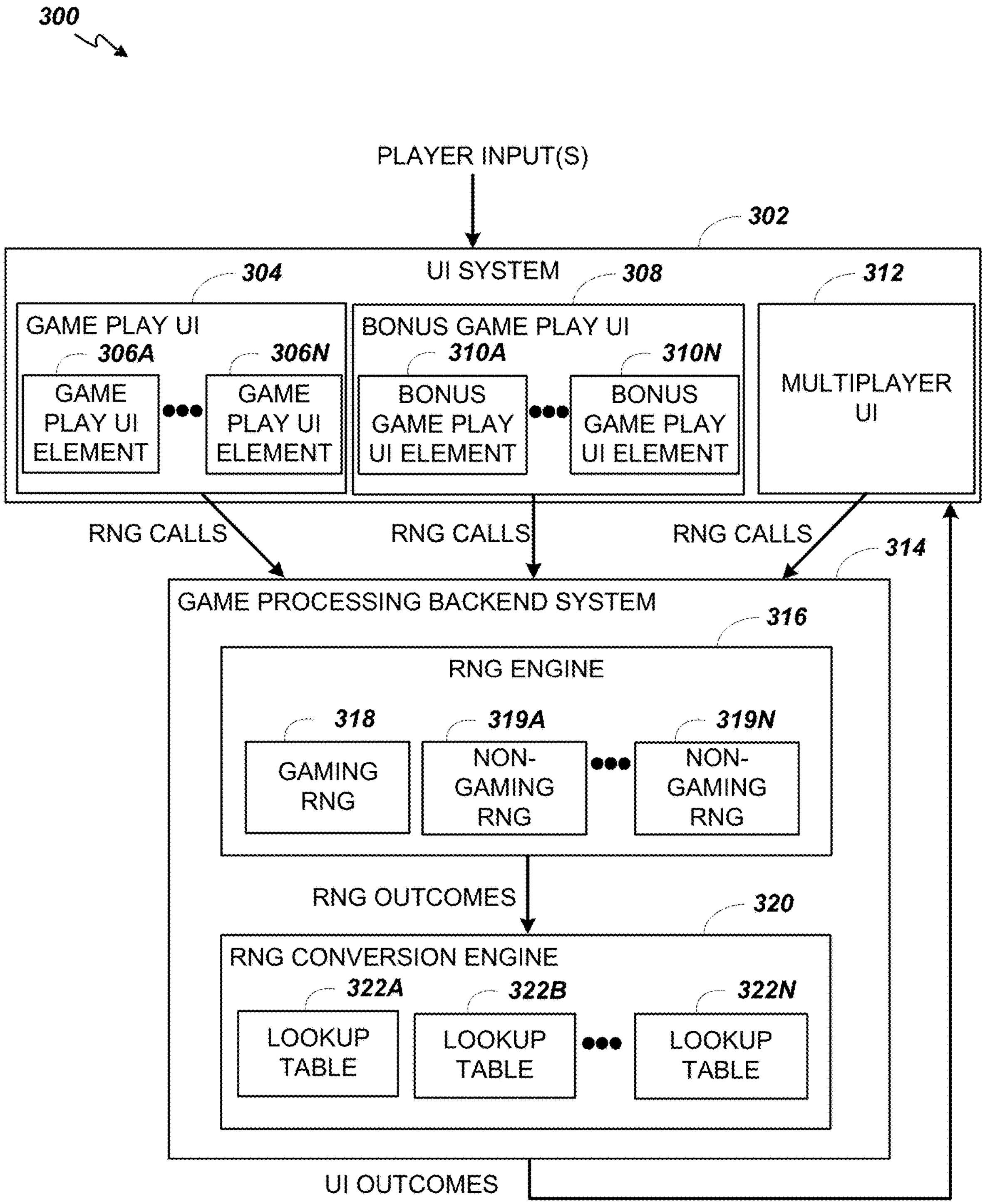
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

As discussed earlier, electronic gaming machines such as those discussed above may include one or more latch mechanisms such as the dual-latch mechanisms discussed herein. FIG. 4 depicts a perspective view of an example dual-latch mechanism which will be used for reference in the following discussion. It will, however, be appreciated that the example dual-latch mechanism of FIG. 4 is but one example of such a device, and that other implementations embodying the concepts discussed herein are to be understood to also be within the scope of this disclosure.

Figure 4:
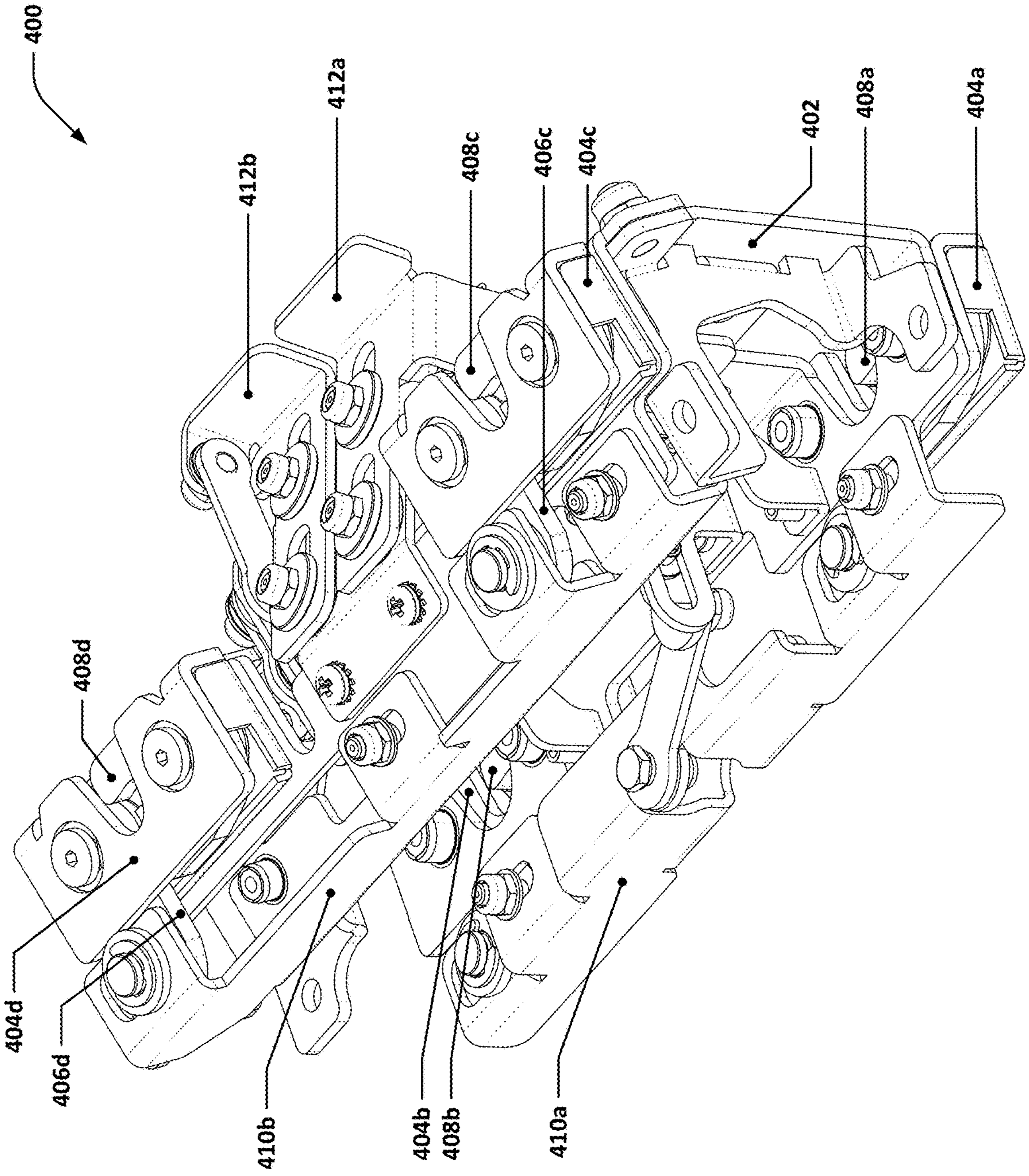
FIG. 4 depicts a perspective view of an example dual-latch mechanism.

In FIG. 4, a dual-latch mechanism 400 is shown. The dual-latch mechanism 400 includes a support bracket 402 that may serve as a rigid support framework that may support the various movable elements of the dual-latch mechanism 400 in space and which may also provide one or more attachment points that allow the dual-latch mechanism 400 to be secured or mounted to, for example, a gaming machine cabinet or other device having doors or trays that may require securement.

The support bracket 402 may be a single-piece design or may, as shown here, be a multi-piece design in which the various separate pieces are bolted, welded, or otherwise joined together to form a generally rigid structure.

The dual-latch mechanism 400 of FIG. 4 actually incorporates two separate dual-latch systems that may be independently or simultaneously operated. It will be understood that other implementations may feature only one such dual-latch system.

As can be seen in FIG. 4, the dual-latch mechanism 400 includes a plurality of rotary latches 404, e.g., 404*a*, 404*b*, 404*c*, and 404*d*. The rotary latches 404*a* and 404*b* are part of one of the two dual-latch systems, while the rotary latches 404*c* and 404*d* are part of the other of the two dual-latch systems. Each of the rotary latches 404*a*, 404*b*, 404*c*, and 404*d* may be mounted to the support bracket 402, e.g., bolted to the support bracket 402.

Figure 5:
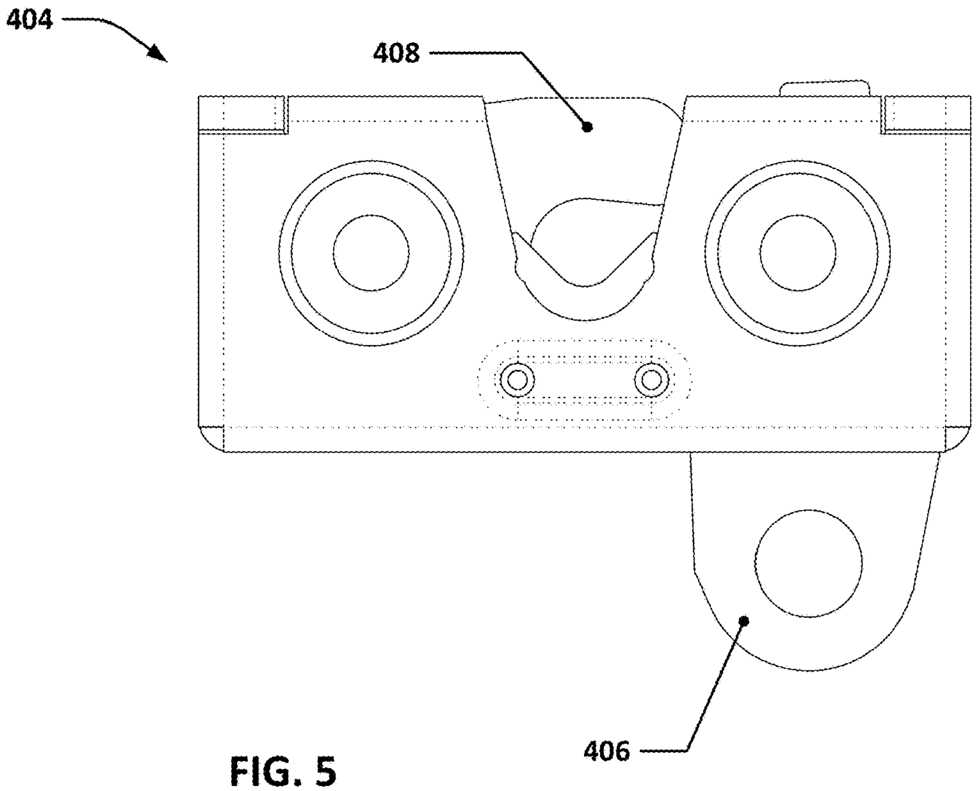
FIG. 5 depicts a rotary latch in a latched configuration.
Figure 6:
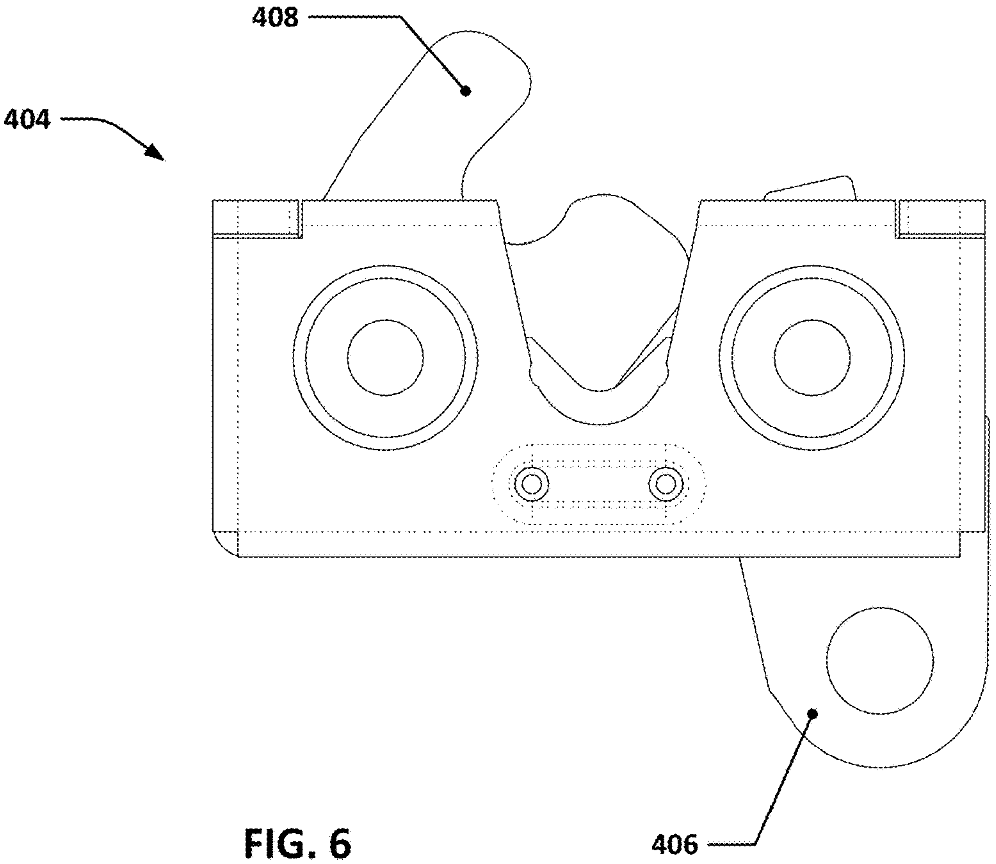
FIG. 6 depicts the rotary latch of FIG. 5 in an unlatched configuration.

An example of a rotary latch 404 is shown in FIG. 5 in a latched state and in FIG. 6 in an unlatched state. The depicted rotary latch 404 is similar to a Southco rotary push-to-close latch, and includes a trigger 406 and a latching member 408 (some designs may feature multiple latching members—for example, the Soutcho R4-50-40-101-10 rotary latch features two latching members that move in concert when latching or unlatching). The latching member 408 is configured to be able to rotate or move between a latched position (as shown in FIG. 5) and an unlatched position (as shown in FIG. 6). In this example, the latching member 408 swings through an arc of approximately 60° when transitioning between the latched and unlatched positions.

The trigger 406 of the rotary latch 404 is configured to be rotatable or movable between an untriggered state (as shown in FIG. 5) and a triggered state (as shown in FIG. 6). When the latching member 408 is in the latched position and the trigger 406 is in the untriggered state, as shown in FIG. 5, the latching member 408 is prevented from moving to the unlatched position by the trigger 406. Stated another way, trigger 406 obstructs movement of the latching member 408 from the latched position to the unlatched position when the latching member 408 is in the latched position and the trigger 406 is in the untriggered state, and trigger 406 enables the movement of the latching member 408 from the latched position to the unlatched position when the latching member 408 is in the latched position and the trigger 406 is in the triggered state. The latching member 408 may, in some implementations, be sprung such that it is constantly being urged towards the unlatched position when in the latched position. In such implementations, moving the trigger 406 from the untriggered state to the triggered state allows the spring to push the latching member 408 from the latched position into the unlatched position, thereby causing the latching member 408 to snap outwards once the trigger 406 is moved from the untriggered state to the triggered state.

The details of such rotary latches 404, e.g., the internal mechanisms of such rotary latches 404, are not discussed here, as rotary latches 404 are commercially available. Moreover, other types of rotary latches 404 that use different internal mechanisms from those used in the rotary latches 404 mentioned above may be used as well, if desired.

Returning to FIG. 4, the triggers 406 for some of the rotary latches 404 can be seen, e.g., triggers 406*c* and 406*d*, as well as the latching members 408, e.g., the latching members 408*a*, 408*b*, 408*c*, and 408*d*.

It can also be seen that the dual-latch mechanism 400 further includes a first actuator 412*a* and a second actuator 412*b*, each of which may be movably mounted to the support bracket 402 such that the first actuator 412*a* is movable between a first actuation position relative to the support bracket 402 and a second actuation position relative to the support bracket 402 and such that the second actuator 412*b* is movable between a third actuation position relative to the support bracket 402 and a fourth actuation position relative to the support bracket 402.

The first actuator 412*a* may be kinematically linked, e.g., by one or more kinematic linkages, to a first common actuator bar 410*a* such that when the first actuator 412*a* is moved from the first actuation position to the second actuation position, the first common actuator bar 410*a* is caused to move along a corresponding axis and from a first position relative to the support bracket 402 to a second position relative to the support bracket 402 (or vice-versa). The axis, for example, may be along the long axis of the first common actuator bar 410*a*.

Similarly, the second actuator 412*b* may be kinematically linked, e.g., by one or more kinematic linkages, to a second common actuator bar 410*b* such that when the second actuator 412*b* is moved from the third actuation position to the fourth actuation position, the second common actuator bar 410*b* is caused to move along a corresponding axis and from a third position relative to the support bracket 402 to a fourth position relative to the support bracket 402. The corresponding axis, for example, may similarly be along the long axis of the second common actuator bar 410*b*.

FIGS. 7 through 10 depict the example dual-latch mechanism of FIG. 4 from a different perspective and in various states of operation. For example, in FIG. 7, the dual-latch mechanism 400 is shown in the same state as in FIG. 4, i.e., with the first actuator 412*a* and the second actuator 412*b* in the first actuation position and the third actuation positions, respectively, and the rotary latches 404*a*, 404*b*, 404*c*, and 404*d* with their latching members 408*a*, 408*b*, 408*c*, and 408*d* all in their respective latched positions. In this configuration, door(s) and/or slide-out tray(s) that have mating features, e.g., striker bolts or striker plates, that are captured by the latching members 408*a*, 408*b*, 408*c*, and 408*d* in the rotary latches 404*a*, 404*b*, 404*c*, and 404*d*, are secured firmly in place by the dual-latch mechanism 400.

Figure 7:
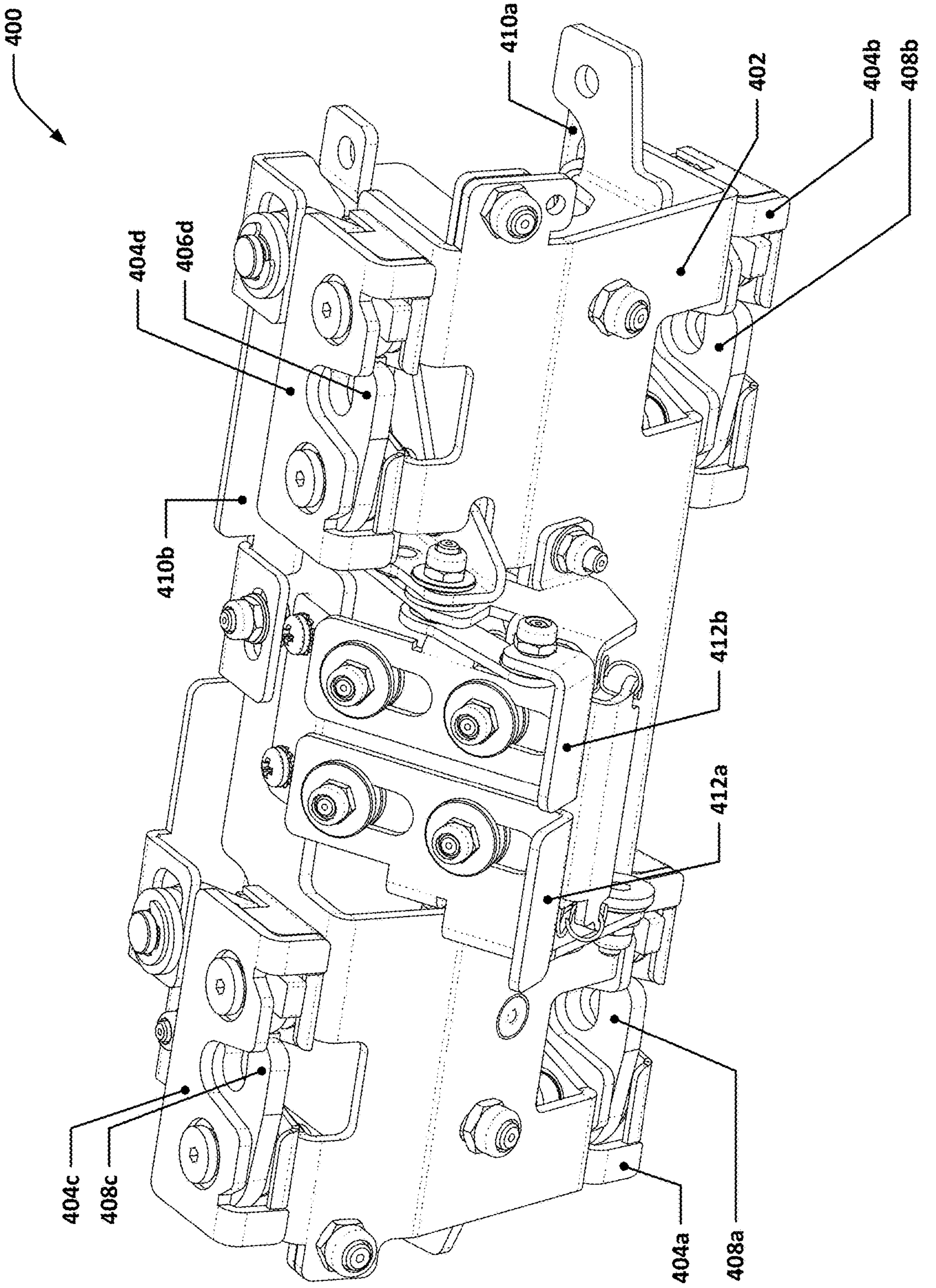
FIGS. 7 through 10 depict the example dual-latch mechanism of FIG. 4 from a different perspective and in various states of operation.
Figure 8:
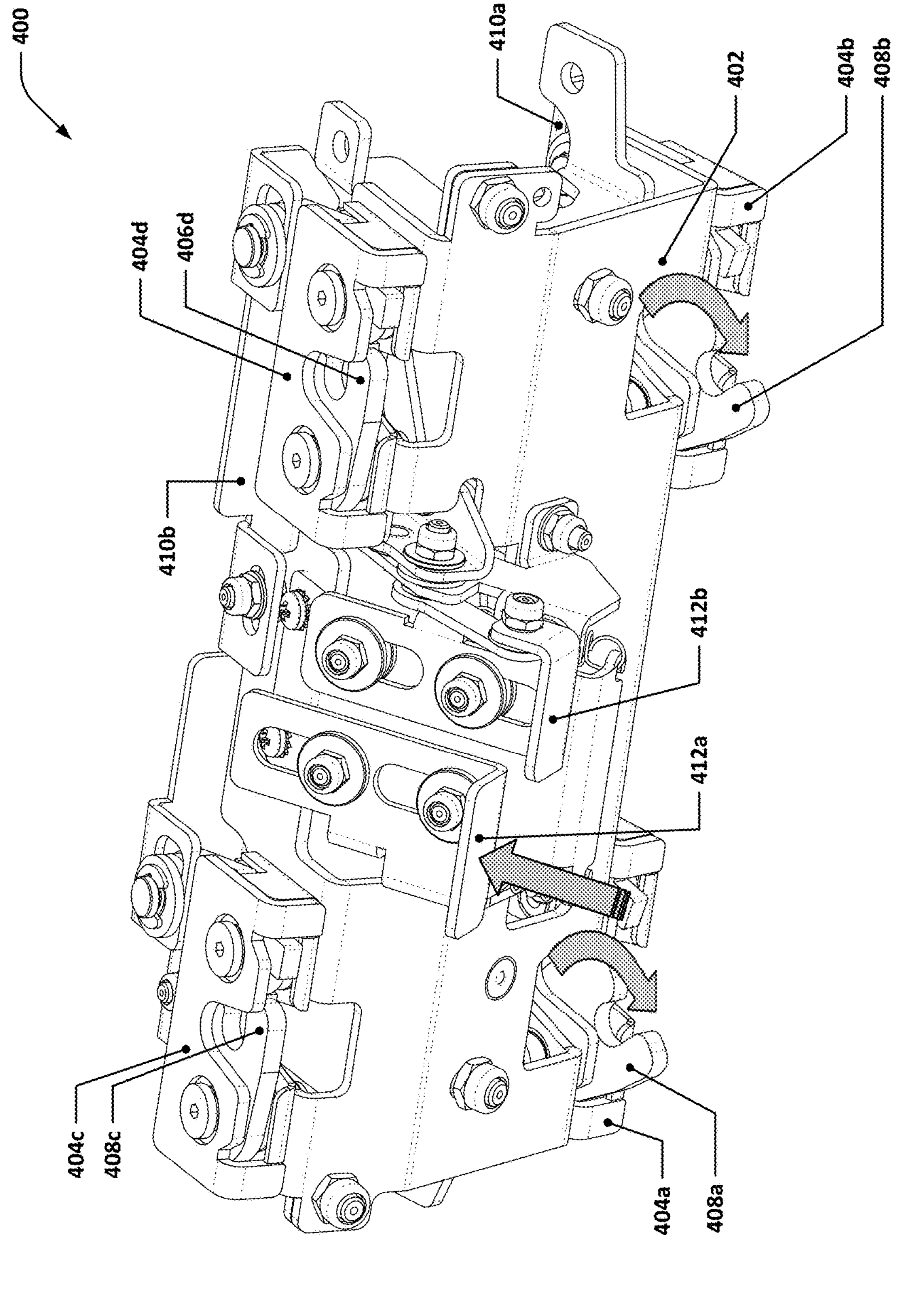

In FIG. 8, the first actuator 412*a* has been moved from the first actuation position relative to the support bracket 402 (as shown in FIG. 7) to a second actuation position relative to the support bracket 402. Such movement has also caused the first common actuator bar 410*a* to move (in this case, to the right of FIG. 8) from the first position relative to the support bracket 402 to the second position relative to the support bracket 402 so as to exert a lateral force on the triggers 406 of the first rotary latch 404*a* and the second rotary latch 404*b* that causes those triggers 406 to transition from the untriggered state to the triggered state. The movement of the triggers 406 of the first rotary latch 404*a* and the second rotary latch 404*b* into the triggered state has caused the latching members 408*a* and 408*b* to move from their respective latched positions to their respective unlatched positions.

Figure 9:
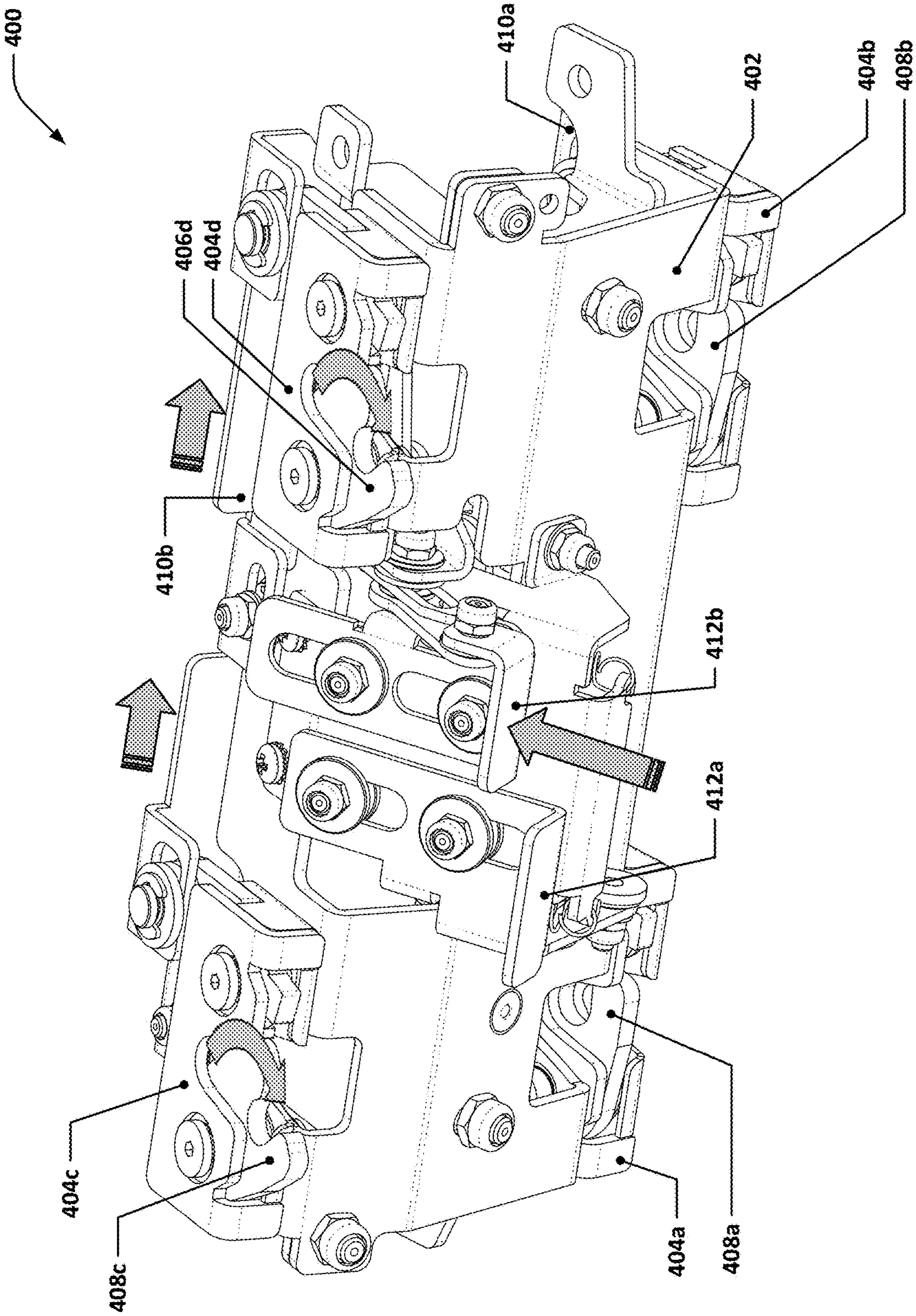

In FIG. 9, the second actuator 412*b* has been moved from the third actuation position relative to the support bracket 402 (as shown in FIG. 7) to a fourth actuation position relative to the support bracket 402. Such movement has also caused the second common actuator bar 410*b* to move (in this case, to the right of FIG. 9) so as to exert a lateral force on the triggers 406 of the third rotary latch 404*c* and the fourth rotary latch 404*d* that causes those triggers 406 to transition from the untriggered state to the triggered state. The movement of the triggers 406 of the third rotary latch 404*c* and the fourth rotary latch 404*d* into the triggered state has caused the latching members 408*c* and 408*d* to move from their respective latched positions to their respective unlatched positions.

Figure 10:
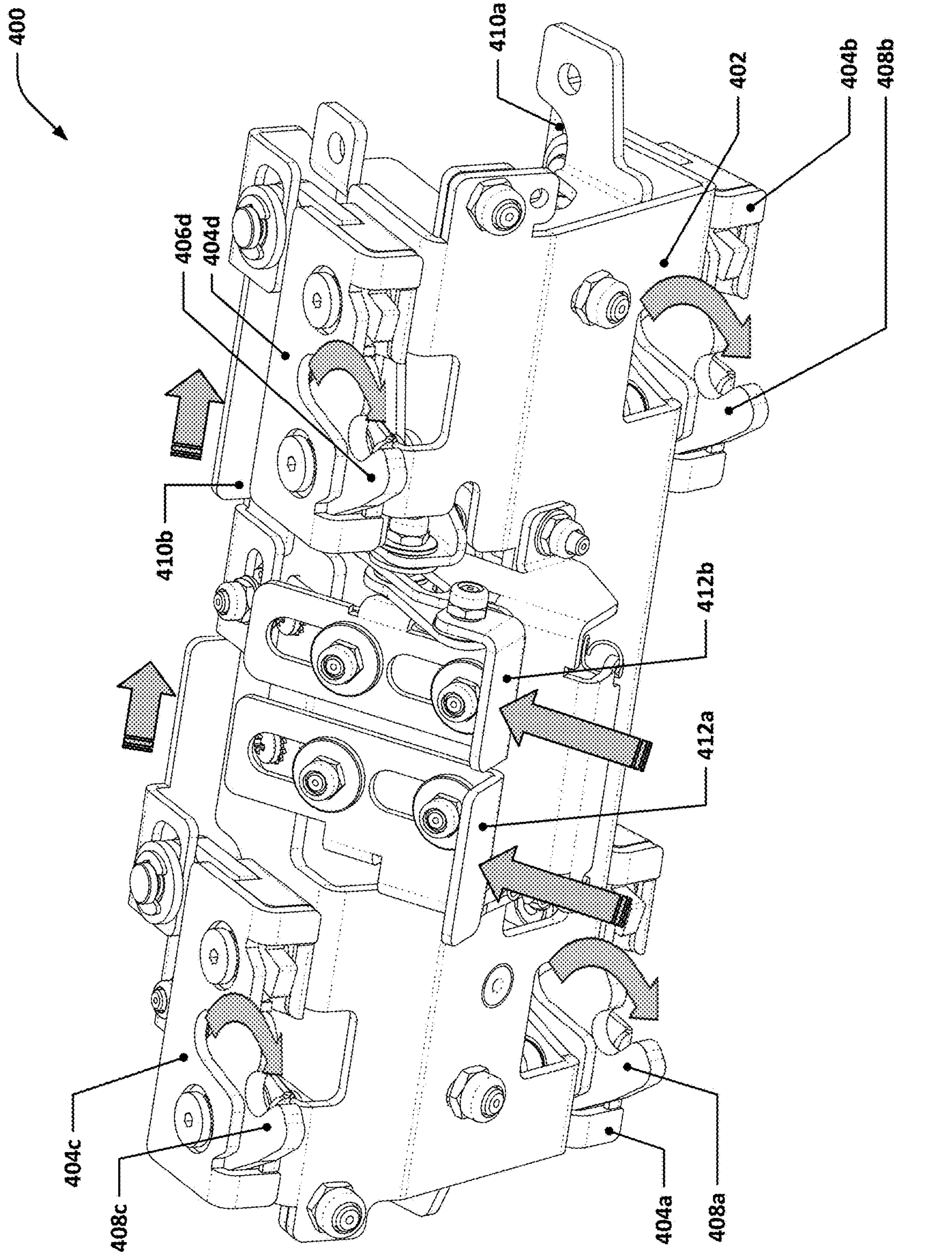

In FIG. 10, the first actuator 412*a* has been moved from the first actuation position to the second actuation position simultaneously with the second actuator 412*b* being moved from the third actuation position to the fourth actuation position. Thus, the first common actuator bar 410*a* and the second common actuator bar 410*b* are both caused to move from the first position and the third position relative to the support bracket 402, respectively, to the second position and the fourth position relative to the support bracket 402, respectively. Such movement of the first common actuator bar 410*a* and the second common actuator bar 410*b* causes the latching members 408*a*, 408*b*, 408*c*, and 408*d* of the rotary latches 404*a*, 404*b*, 404*c*, and 404*d* to all transition from their respective latched positions to their respective unlatched positions in a generally simultaneous manner.

Figure 11:
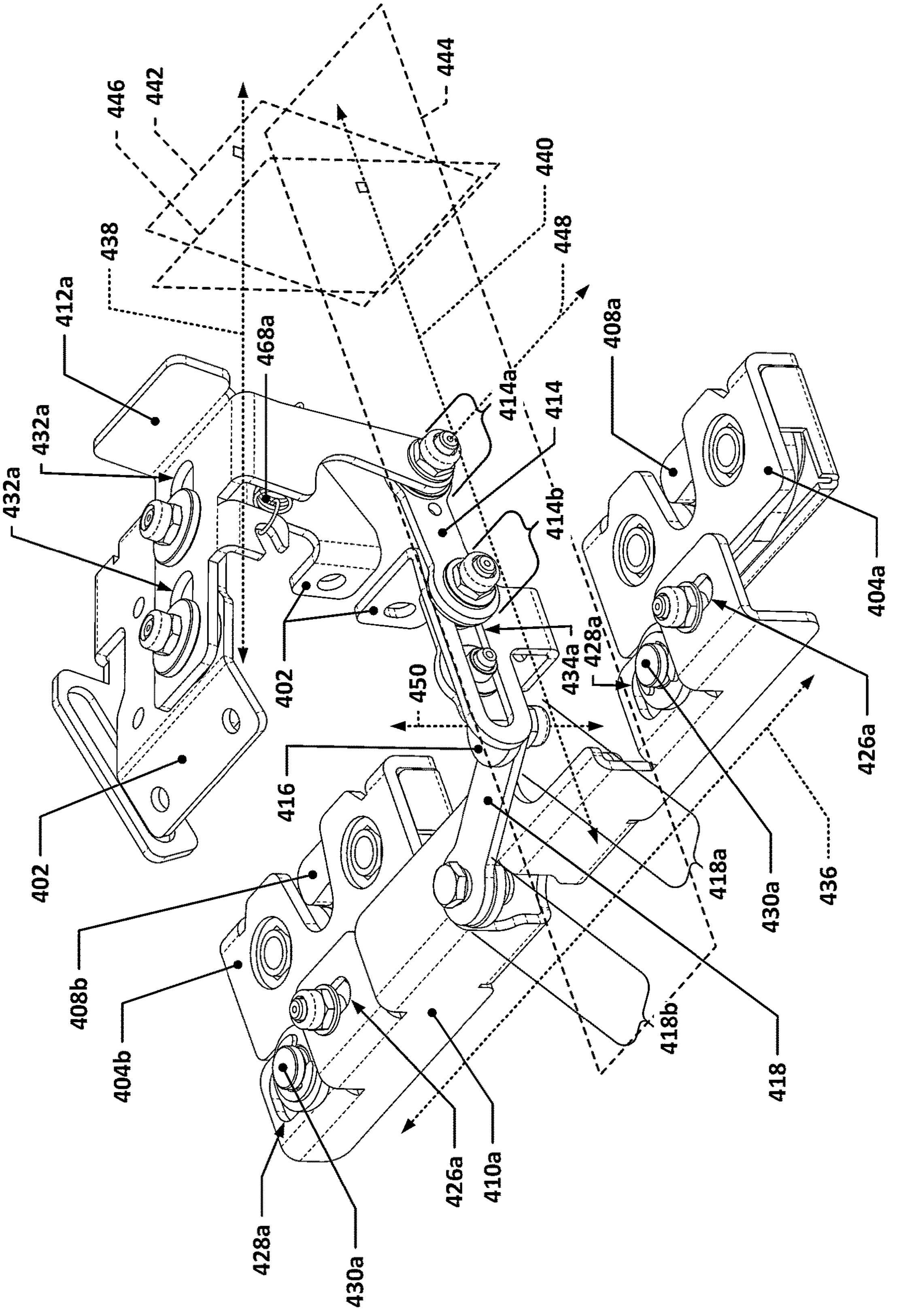
FIGS. 11 and 12 depict a sub-portion of the example dual-latch mechanism of FIG. 4 that includes a first set of latches.
Figure 12:
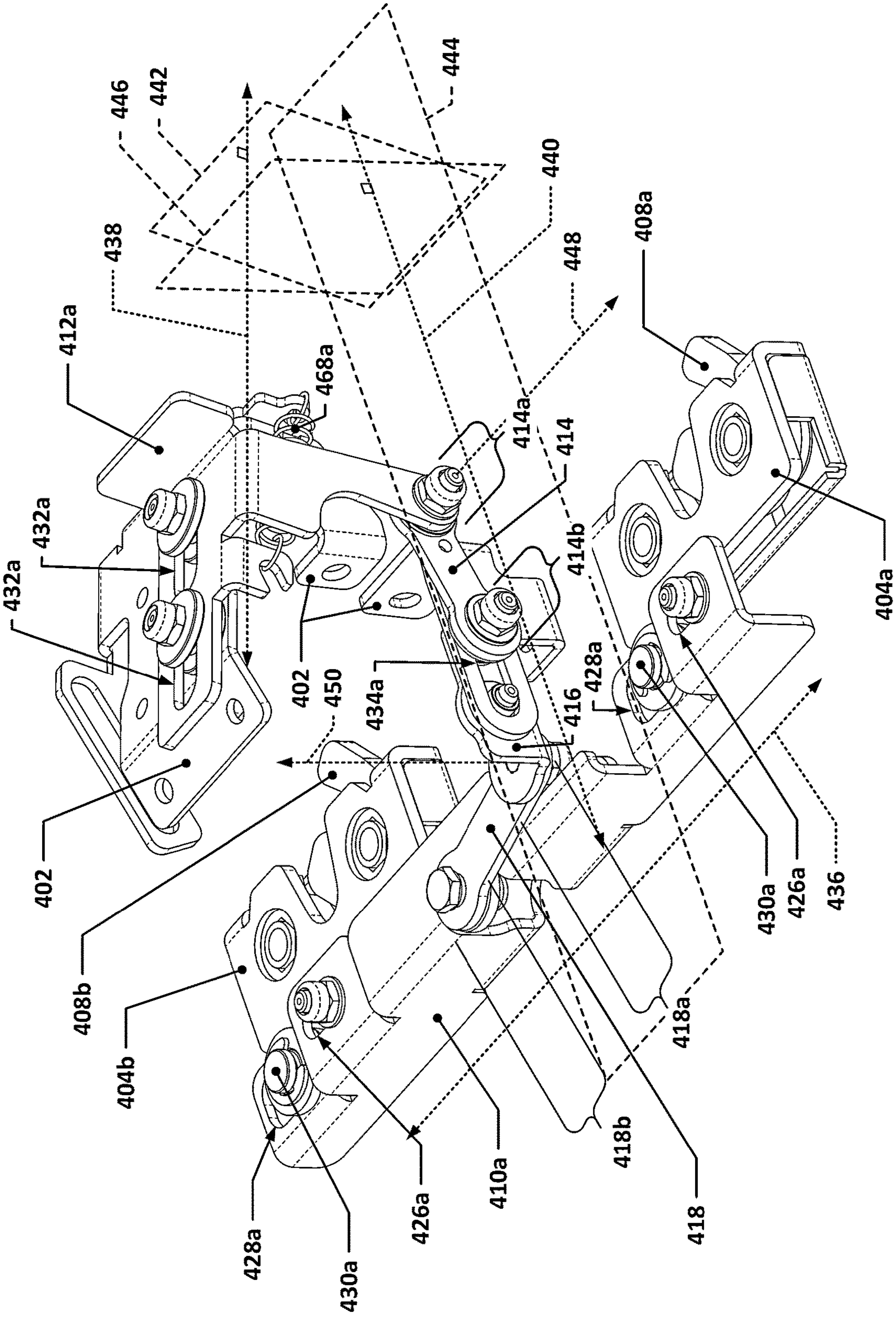
Figure 13:
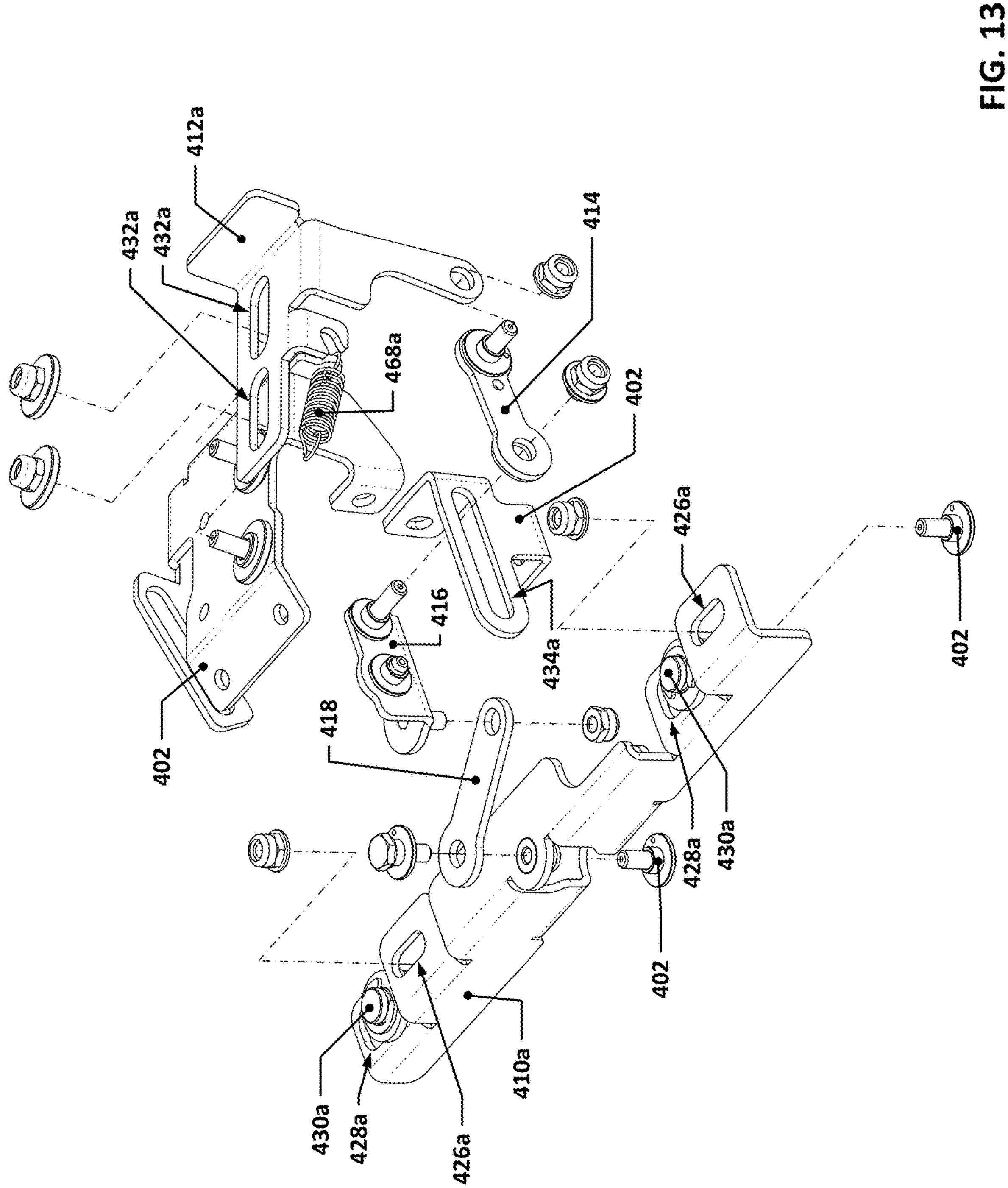
FIG. 13 depicts an exploded view of some of the elements shown in FIGS. 11 and 12.
Figure 14:
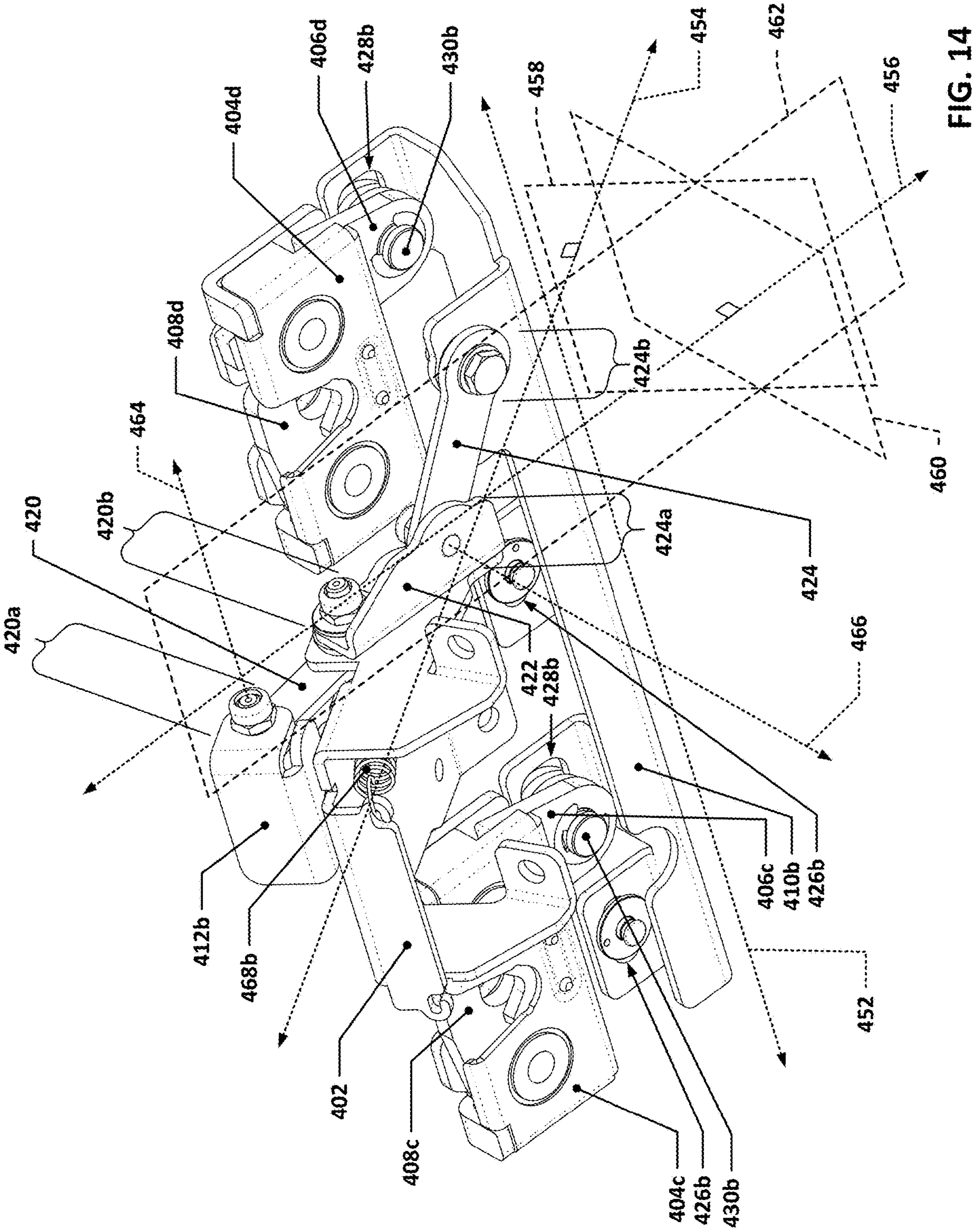
FIGS. 14 and 15 depict a sub-portion of the example dual-latch mechanism of FIG. 4 that includes a second set of latches.
Figure 15:
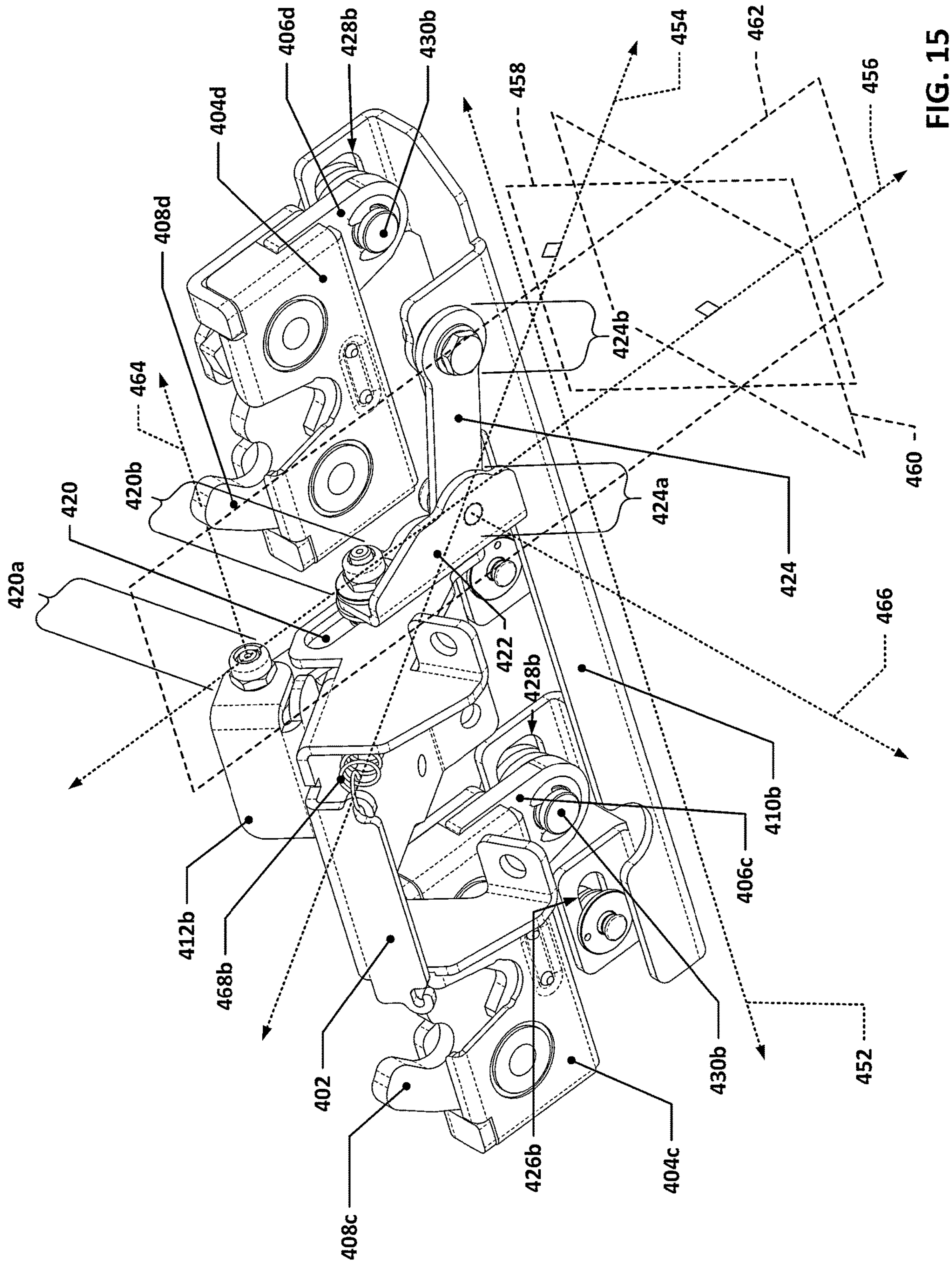
Figure 16:
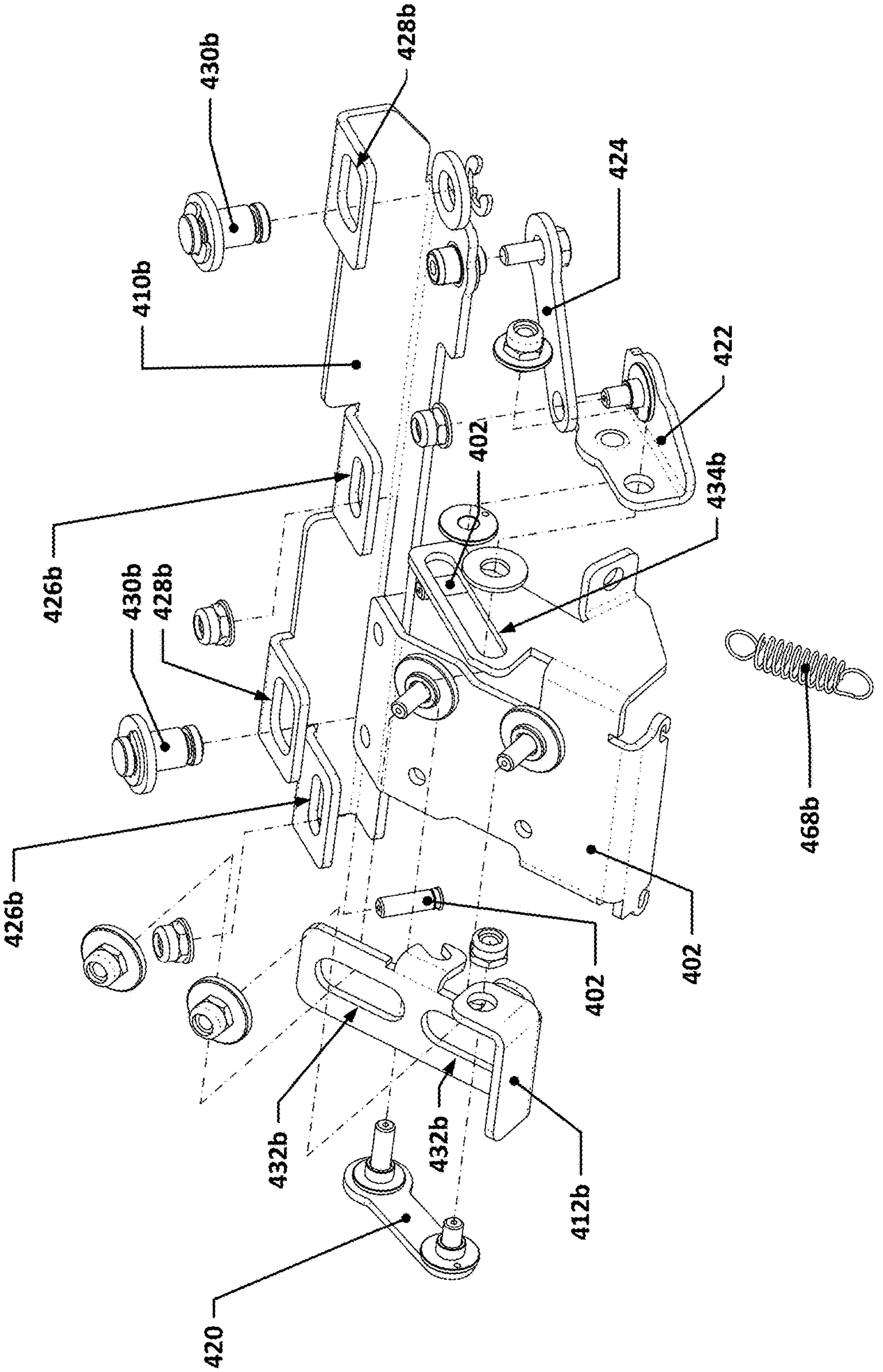
FIG. 16 depicts an exploded view of some of the elements shown in FIGS. 14 and 15.

The details of the kinematic linkages that permit the various types of latch actuation discussed above may take a variety of forms. In the particular implementation shown in FIGS. 4 through 10, however, the kinematic linkages that are used each include a pair of rotational links and corresponding sliding members. The kinematic linkage for the first dual-latch system is shown in FIGS. 11 and 12, while the kinematic linkage for the second dual-latch system is shown in FIGS. 14 and 15. FIG. 13 shows an exploded view of some of the components shown in FIGS. 11 and 12, while FIG. 16 shows an exploded view of some of the components shown in FIGS. 14 and 15.

FIG. 11 shows the kinematic linkage for the first dual-latch system with the first actuator 412*a* in the first actuation position and the first rotary latch 404*a* and the second rotary latch 404*b* with their respective latching members 408 in their corresponding latched positions, while FIG. 12 shows the kinematic linkage for the first dual-latch system with the first actuator 412*a* in the second actuation position and the first rotary latch 404*a* and the second rotary latch 404*b* with their respective latching members 408 in their corresponding unlatched positions. Similarly, FIG. 14 shows the kinematic linkage for the second dual-latch system with the second actuator 412*b* in the third actuation position and the third rotary latch 404*c* and the fourth rotary latch 404*d* with their respective latching members 408 in their corresponding latched positions, while FIG. 15 shows the kinematic linkage for the second dual-latch system with the third actuator 412*c* in the fourth actuation position and the third rotary latch 404*c* and the fourth rotary latch 404*d* with their respective latching members 408 in their corresponding unlatched positions.

In FIGS. 11 through 15, the majority of the support bracket 402 has been hidden from view, as have the components associated with the second dual-latch system. Similarly, in FIGS. 14 and 15, the majority of the support bracket 402 has been hidden from view, as well as the components associated with the first dual-latch system.

In FIGS. 11 and 12, the portions of the support bracket 402 that are shown provide mounting locations for the various movable elements of the kinematic linkage of the first dual-latch system. For example, the first common actuator bar 410*a* may be mounted to the support bracket 402 by way of threaded studs that extend up from the support bracket 402 and pass through obround first bar guide slots 426*a* in the first common actuator bar 410*a*. Nuts threaded onto the threaded studs may act to capture the first common actuator bar 410*a* but still allow the first common actuator bar 410*a* to be translatable or slidable along a first axis 436 relative to the support bracket 402, e.g., between the first position relative to the support bracket 402 and the second position relative to the support bracket 402. In FIGS. 11 and 12, the threaded studs and nuts are shown, but the portion of the support bracket that the threaded studs extend from is not shown.

Similarly, the portion of the support bracket 402 that is interfaced with the first actuator 412*a* has two bushings that are secured to the support bracket 402 by corresponding nuts that are threaded onto threaded studs that protrude from the support bracket 402. The two bushings are inserted through corresponding obround first actuator guide slots 432*a* on the first actuator 412*a* so that the first actuator 412*a* is captured by the bushings but is able to slide along a second axis 438 relative to the support bracket 402.

As can be seen, a first spring 468*a* is stretched between the first actuator 412*a* and the support bracket 402; the first spring 468*a* may be arranged to pull the first actuator 412*a* into the first actuation position.

The first actuator 412*a* has a tab at one end that is generally perpendicular to the second axis 438 and may be used as a surface against which a motive force may be applied in order to push the first actuator 412*a* from the first actuation position to the second actuation position. The first actuator 412*a* may also have an arm or tab that extends at a right angle from the portion of the first actuator 412*a* that has the first actuator guide slots 432*a*. A first driving link 414 may have a first end 414*a* that is rotatably connected with the first actuator 412*a*, e.g., at the end of the arm or tab mentioned above, and a second end 414*b* that is rotatably connected with a first sliding member 416. The first sliding member 416 may, for example, be slidably engaged with an obround first slide guide slot 434*a* in the support bracket 402 and secured to the support bracket 402 such that the first sliding member 416 is able to translate or slide along a third axis 440.

The first driving link 414 may, when the first actuator 412*a* is moved along the second axis 438, translate that translational motion into translational movement of the first sliding member 416 along the third axis 440. In doing so, the first driving link 414 may rotate relative to the first actuator 412*a* and about a first rotational axis 448 that is parallel to the first axis 436.

The kinematic linkage of the first dual-latch system may also include a first driven link 418 that has a first end 418*a* that is rotatably connected with the first sliding member 416 and a second end 418*b* that is rotatably connected with the first common actuator bar 410*a*. The first driven link 418 may have a long axis that is at an oblique angle relative to the third axis 440, thereby allowing sliding motion of the first sliding member 416 along the third axis 440 to be translated into motion of the second end 418*b* of the first driven link 418, and thus the first common actuator bar 410*a*, along the first axis 436. In doing so, the first driven link 418 may rotate relative to the first sliding member 416 and about a second rotational axis 450 that is parallel to a plane that is parallel to the first axis 436 and perpendicular to another plane that is parallel to both the first axis 436 and the third axis 440.

The first common actuator bar 410*a* may also have first trigger slots 428*a* that may engage with first trigger pins 430*a* that are part of the triggers 406 of the first rotary latch 404*a* and the second rotary latch 404*b*. The first trigger slots 428*a* may be sized such that when the first common actuator bar 410*a* is moved to the first position, the first trigger pins 430*a* may come into contact with the sides of the first trigger slots 428*a* for at least some of the travel of the first common actuator bar 410*a* and thus be moved from the untriggered state to the triggered state, thereby causing the latching members 408 of the first rotary latch 404*a* and the second rotary latch 404*b* to move from their respective latched positions to their respective unlatched positions.

It will be appreciated that in other implementations, the first actuator 412*a* may, instead of sliding relative to the support bracket 402, be rotatably mounted to the support bracket 402 such that it can pivot or rotate relative to the support bracket 402, e.g., about an axis parallel to the first rotational axis 448, thereby producing a swinging motion in the end of the first actuator 412*a* that may drive the first driving link 414 in a similar manner.

It can be seen that the second axis 438 may be perpendicular to a first reference plane 442 that is parallel to the first axis 436 and the third axis 440 may be perpendicular to a second reference plane 444 that is also parallel to the first axis 436. In the depicted example, the second axis 438 is at an oblique angle to the second reference plane 446, thereby allowing the first actuator 412*a* to slide along a direction that is not aligned with the third axis 440 and parallel to a plane that is not skewed with respect to the mounting plane of the first rotary latch 404*a* and the second rotary latch 404*b*.

FIG. 13 depicts an exploded view of some of the components shown in FIGS. 11 and 12, although the first rotary latch 404*a* and the second rotary latch 404*b* are both omitted from this view to avoid obscuring other features. The various elements shown have been previously discussed and the earlier discussion of such elements may be referred to for the purposes of reviewing FIG. 13.

The second dual-latch system operates in a similar manner to the first dual-latch mechanism, although the specific components have somewhat different shapes. The operating principles between the two dual-latch systems are similar, however.

In FIGS. 14 and 15, the portions of the support bracket 402 that are shown provide mounting locations for the various movable elements of the kinematic linkage of the second dual-latch system. For example, the second common actuator bar 410*b* may be mounted to the support bracket 402 by way of pins that extend up from the support bracket 402 and pass through obround second bar guide slots 426*b* in the second common actuator bar 410*b*. Snap rings snapped onto the pins may act to capture the second common actuator bar 410*b* but still allow the second common actuator bar 410*b* to be translatable or slidable along a fourth axis 452 relative to the support bracket 402, e.g., between the third position relative to the support bracket 402 and the fourth position relative to the support bracket 402. In FIGS.

14 and 15, the pins and snap rings are shown, but the portion of the support bracket that the pins extend from is not shown.

Similarly, the portion of the support bracket 402 that is interfaced with the second actuator 412*b* has two bushings that are secured to the support bracket 402 by corresponding nuts that are threaded onto threaded studs that protrude from the support bracket 402. The two bushings are inserted through corresponding obround second actuator guide slots 432*b* on the second actuator 412*b* so that the second actuator 412*b* is captured by the bushings but is able to slide along a fifth axis 454 relative to the support bracket 402.

As can be seen, a second spring 468*b* is stretched between the second actuator 412*b* and the support bracket 402; the second spring 468*b* may be arranged to pull the second actuator 412*b* into the third actuation position.

The second actuator 412*b* has a tab at one end that is generally perpendicular to the fifth axis 454 and may be used as a surface against which a motive force may be applied in order to push the second actuator 412*b* from the third actuation position to the fourth actuation position. A second driving link 420 may have a first end 420*a* that is rotatably connected with the second actuator 412*b*, e.g., to a short secondary tab that extends at a right angle from the tab discussed above, and a second end 420*b* that is rotatably connected with a second sliding member 422. The second sliding member 422 may, for example, be slidably engaged with an obround second slide guide slot 434*b* in the support bracket 402 and secured to the support bracket 402 such that the second sliding member 422 is able to translate or slide along a sixth axis 456.

The second driving link 420 may, when the second actuator 412*b* is moved along the fifth axis 454, translate that translational motion into translational movement of the second sliding member 422 along the sixth axis 456. In doing so, the second driving link 420 may rotate relative to the second actuator 412*b* and about a third rotational axis 464 that is parallel to the fourth axis 452.

The kinematic linkage of the second dual-latch system may also include a second driven link 424 that has a first end 424*a* that is rotatably connected with the second sliding member 422 and a second end 424*b* that is rotatably connected with the second common actuator bar 410*b*. The second driven link 424 may have a long axis that is at an oblique angle relative to the sixth axis 456, thereby allowing sliding motion of the second sliding member 422 along the sixth axis 456 to be translated into motion of the second end 424*b* of the second driven link 424, and thus the second common actuator bar 410*b*, along the fourth axis 452. In doing so, the second driven link 424 may rotate relative to the second sliding member 422 and about a third rotational axis 464 that is parallel to a plane that is parallel to the fourth axis 452 and perpendicular to another plane that is parallel to both the fourth axis 452 and the sixth axis 456.

The second common actuator bar 410*b* may also have second trigger slots 428*b* that may engage with second trigger pins 430*b* that are part of the triggers 406 of the third rotary latch 404*c* and the fourth rotary latch 404*d*. The second trigger slots 428*b* may be sized such when the second common actuator bar 410*b* is moved to the third position, the second trigger pins 430*b* may come into contact with the sides of the second trigger slots 428*b* for at least some of the travel of the second common actuator bar 410*b* and thus be moved from the untriggered state to the triggered state, thereby causing the latching members 408 of the third rotary latch 404*c* and the fourth rotary latch 404*d* to move from their respective latched positions to their respective unlatched positions.

It will be appreciated that in other implementations, the second actuator 412*b* may, instead of sliding relative to the support bracket 402, be rotatably mounted to the support bracket 402 such that it can pivot or rotate relative to the support bracket 402, e.g., about an axis parallel to the third rotational axis 464, thereby producing a swinging motion in the second actuator 412*b* that may drive the second driving link 420 in a similar manner.

It can be seen that the fifth axis 454 may be perpendicular to a fourth reference plane 458 that is parallel to the fourth axis 452 and the sixth axis 456 may be perpendicular to a fifth reference plane 460 that is also parallel to the fourth axis 452. In the depicted example, the fifth axis 454 is at an oblique angle to the fifth reference plane 4460, thereby allowing the second actuator 412*b* to slide along a direction that is not aligned with the sixth axis 456 and parallel to a plane that is not skewed with respect to the mounting plane of the third rotary latch 404*c* and the fourth rotary latch 404*d*.

FIG. 16 depicts an exploded view of some of the components shown in FIGS. 14 and 15, although the third rotary latch 404*c* and the fourth rotary latch 404*d* are both omitted from this view to avoid obscuring other features. The various elements shown have been previously discussed and the earlier discussion of such elements may be referred to for the purposes of reviewing FIG. 16.

Figure 17:
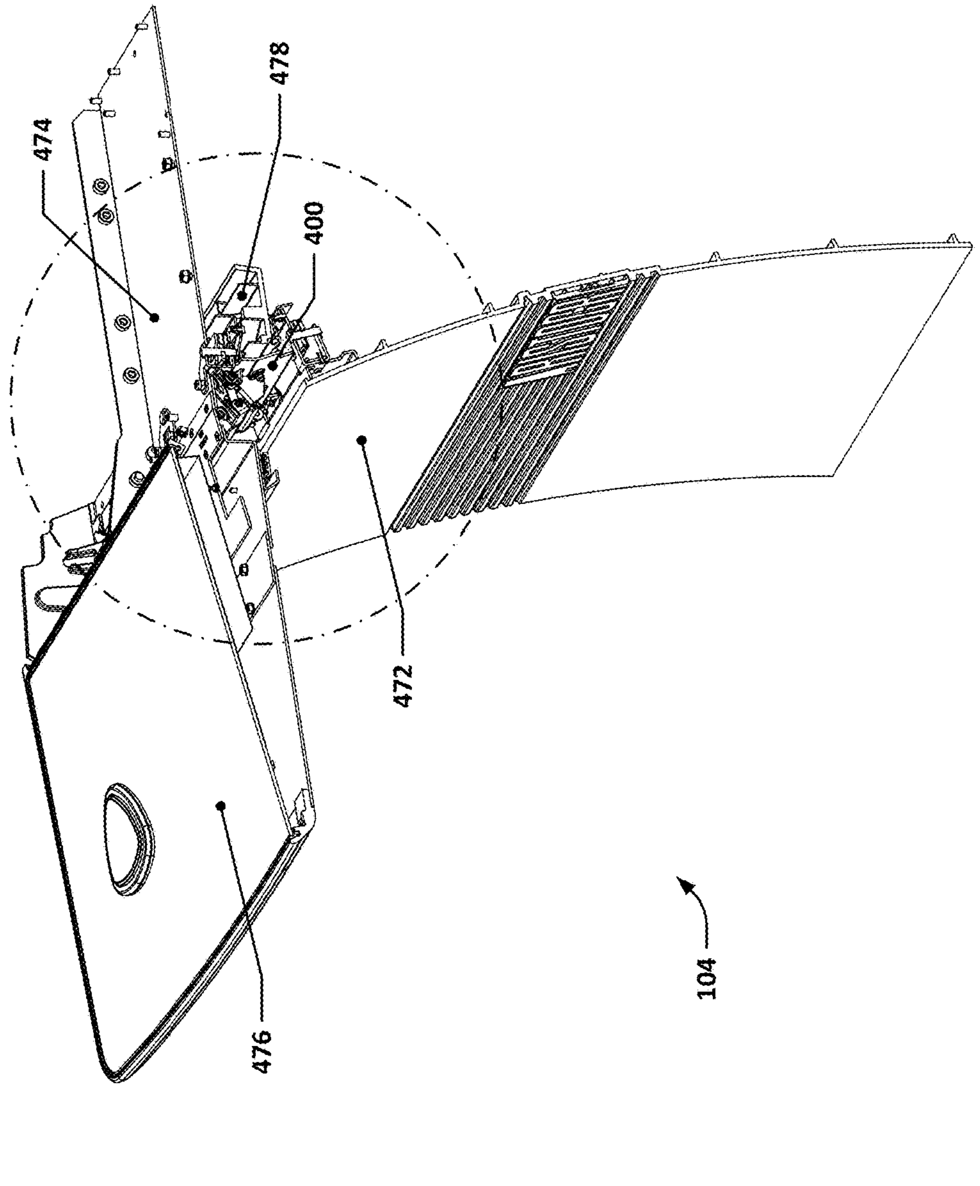
FIG. 17 depicts a perspective cutaway view of a portion of an electronic gaming machine cabinet incorporating a dual-latch mechanism.
Figure 18:
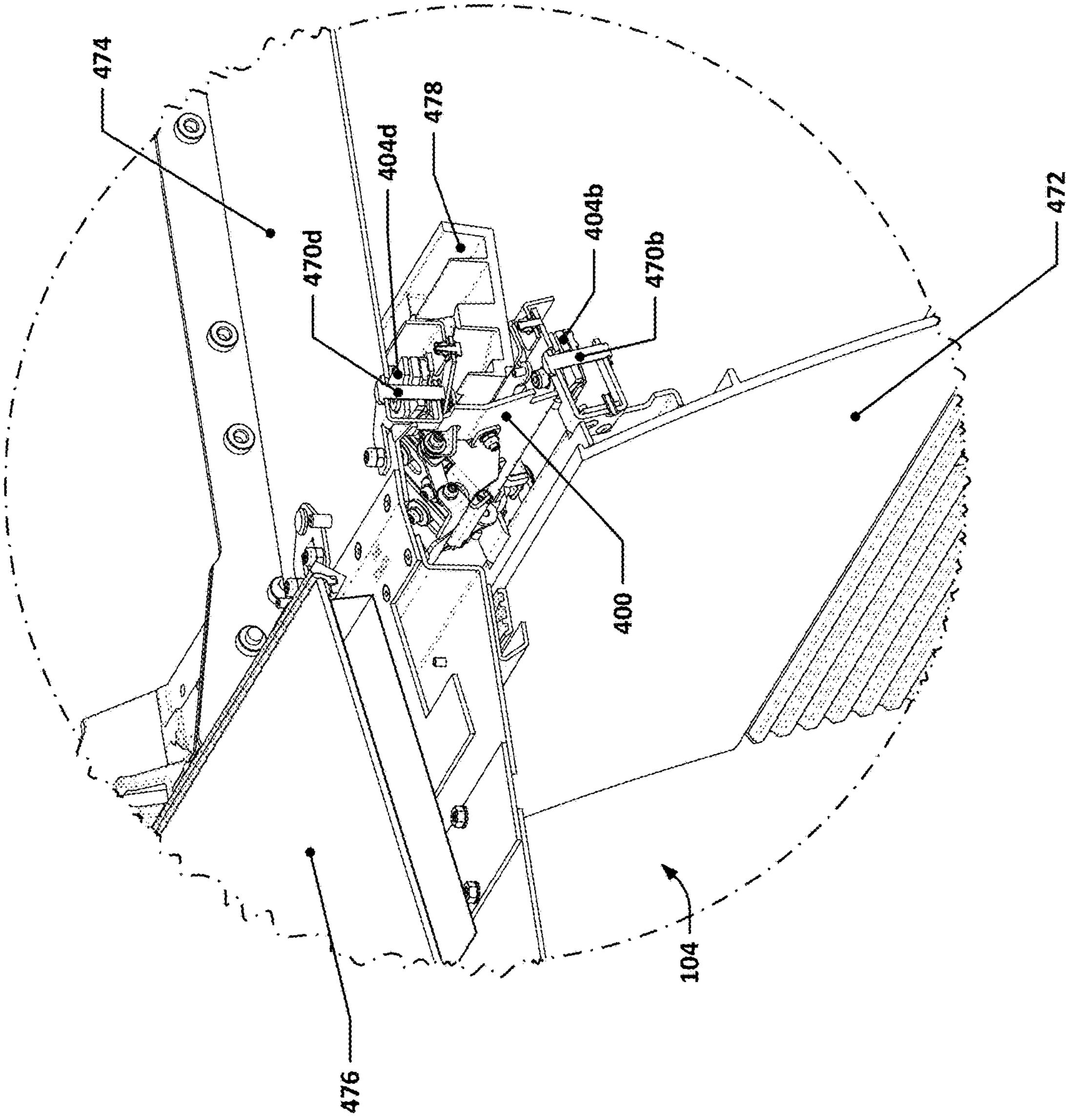
FIG. 18 depicts a detail view of the circled area in FIG. 17.
Figure 19:
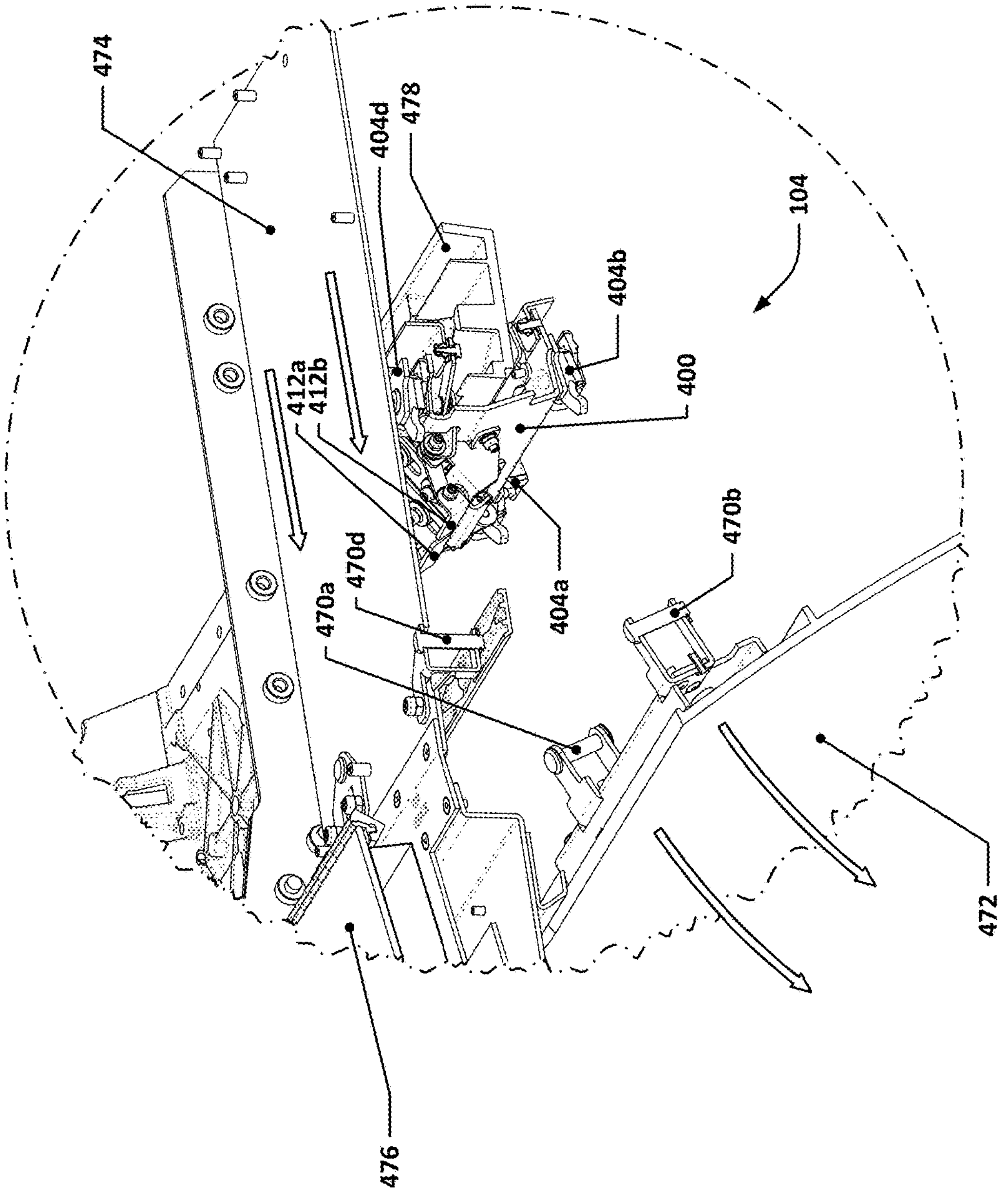
FIG. 19 depicts the detail view of FIG. 18, but with a door of the electronic gaming machine partially open and a tray of the electronic gaming machine slid partially out.

As noted earlier, the dual-latch mechanisms discussed herein may be used, for example, in electronic gaming machines in order to secure doors and/or sliding trays in place. Such doors and sliding trays may, for example, be movable to allow access to the interior of the electronic gaming machine. FIGS. 17 through 19 depict an implementation in which a dual-latch mechanism is installed in an electronic gaming machine 104. FIG. 17 depicts a perspective cutaway view of a portion of a cabinet of the electronic gaming machine 104 incorporating the dual-latch mechanism. Visible in FIG. 17 is a button deck 476 that is connected with a cabinet frame 478 of the cabinet of the electronic gaming machine 104 via a sliding tray 474. The button deck 476 may be slid in and out, more or less horizontally, between an extended position and a retracted position relative to the cabinet of the electronic gaming machine 104 using the sliding tray 474. Also visible in FIG. 17 is a door 472 that may be pivoted about a hinge in order to move the door 472 between an open configuration and a closed configuration. The electronic gaming machine 104 may also include a dual-latch mechanism 400, such as those discussed above, that is secured to the cabinet frame 478 and that may act to secure the door 472 and the sliding tray 474 in place relative to the cabinet frame 478.

FIG. 18 depicts a detail view of the circled area in FIG. 17. As can be seen, the cutting plane used in the cutaway view of FIG. 17 passes through the rotary latches 404*b* and 404*d*. Also visible in FIG. 18 are a second latch strike 470*b* and a fourth latch strike 470*d* (a first latch strike and a third latch strike are also included, but not visible in FIG. 18), which may, for example, be steel posts or other features that are able to engage with the latching members of the rotary latches 404*b* and 404*d* when the latch members of the rotary latches 404*b* and 404*d* are in the unlatched position. The first through fourth latch strikes 470 may, when pushed into the latching members of the rotary latches 404, cause the latching members of the rotary latches 404 to transition to their respective latched positions, thereby capturing the first through fourth latch strikes 470 within the rotary latches 404, as shown in FIG. 18.

The dual-latch mechanism 400 is, in FIGS. 17 through 19, shown as being accessible from the exterior of the electronic gaming machine 104, although in actual practice, a security cover or other mechanism may be used to cover the dual-latch mechanism 400 and prevent unauthorized access to, and operation of, the dual-latch mechanism 400.

The support bracket of the dual-latch mechanism 400 may be positioned within the gaming machine cabinet such that, when the door is in the closed configuration and the sliding tray is in the retracted position, the first through fourth latch strikes engage with, and are secured by, the first through fourth rotary latches 404.

FIG. 19 depicts the detail view of FIG. 18, but with the door 472 of the electronic gaming machine 104 partially open and the sliding tray 474 of the electronic gaming machine 104 partially slid out. As can be seen, the latching members of the rotary latches 404 are in their respective unlatched positions, having been released through movement of the first actuator **412*a* between the first actuation position and the second actuation position and movement of the second actuator 412*b*** between the third actuation position and the fourth actuation position.

As can be seen, a dual-latch mechanism such as the dual-latch mechanism 400 may allow for rotary latches to be used that are positioned such that their latching members rotate about rotational axes that are, for example, misaligned with respect to the plane of motion of the first and second actuators. For example, in the depicted implementation, the rotational axes of the latching members of the various rotary latches shown are neither perpendicular to, nor parallel to, the plane of motion of the first and second actuators (e.g., the plane along which sliding contact between the first and second actuators and the support bracket occurs). This allows for the latching mechanism to secure and latch components that may interface with the gaming machine cabinet at somewhat arbitrary angles, thereby allowing the design of the gaming machine to utilize non-orthogonal surfaces that may allow the gaming machine to have a more streamlined appearance.

It will also be understood that the trigger pins **430*a* and 430*a* are depicted as cylindrical pins in the figures, the trigger pins 430*a* and 430*b*** may also be shoulder screws or other fasteners. It will also be understood that in any instances where there is a linear guide in which one part is constrained to translate along a linear axis relative to another part, the elements of such a linear guide may be arranged such that the guide element is on one part and the guided element on the other, or vice-versa. For example, if components A and B are configured such that one of components A and B may be translated linearly relative to another of components A and B, one such implementation may involve the component A having a linear slot in it and the component B having two pins that protrude into the slot and slidingly engage with the linear slot. However, the same end result may also be reached if the linear slot is instead in the component B and the two pins are instead in component A. Thus, the various specific linear guiding features discussed in the above example, may, it will be appreciated, be reversed as described above.

As discussed earlier, dual-latch mechanisms such as those discussed above may, in some cases, be interfaced with a multiple-actuator system with a common locking element. Such multiple-actuator systems with a common locking element may also be used with other devices as well.

Figure 20:
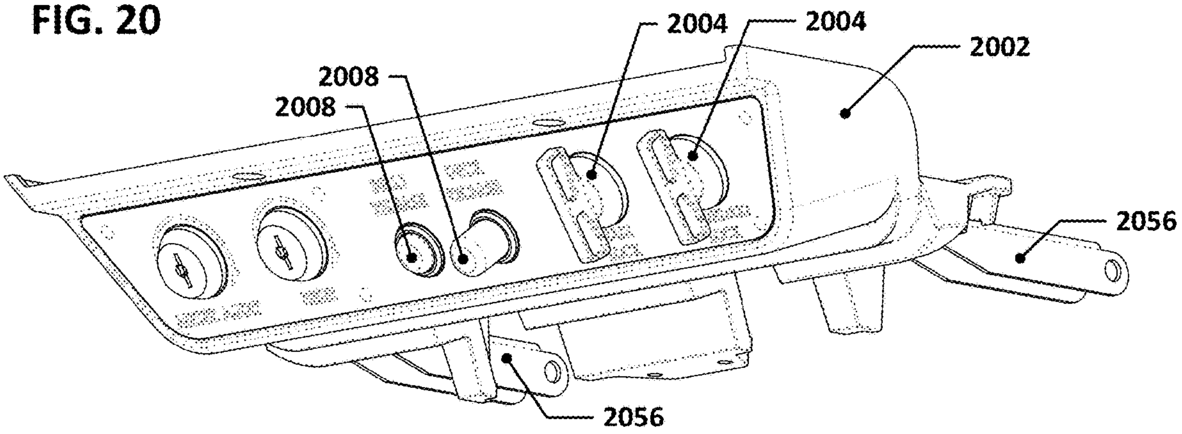
FIGS. 20 through 22 depict views of an example of a multiple-actuator system with a common locking element in multiple states of operation.
Figure 21:
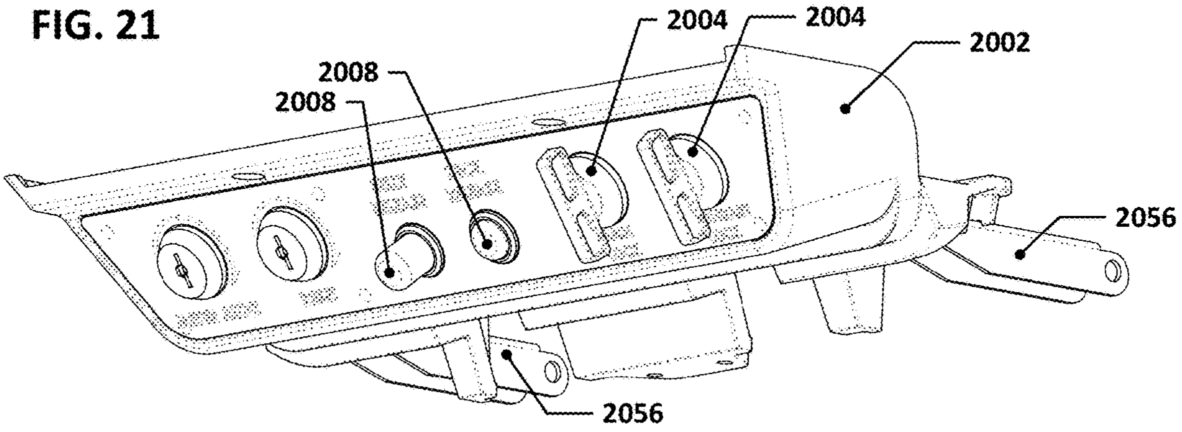
Figure 22:
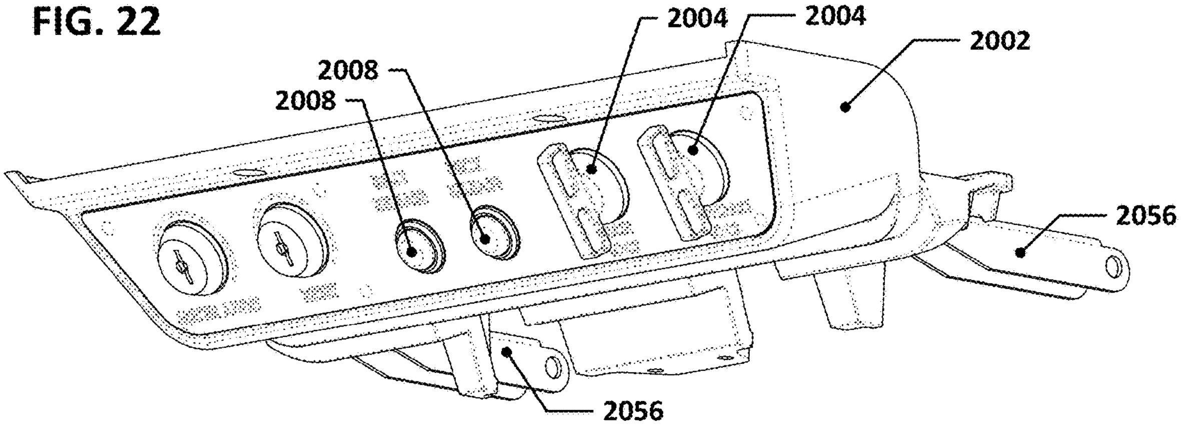

FIGS. 20 through 22 depict views of an example of a multiple-actuator system with a common locking element (also referred to below simply as "system") in multiple states of operation. The system may include a housing 2002 that may be attached to a cabinet of a gaming machine, e.g., via hinge brackets 2056, such that various features external to the housing 2002 are accessible from the exterior of the gaming machine. For example, the housing 2002 in this example includes two movable actuators 2008 that may be moved between corresponding first positions and corresponding second positions. In FIG. 20, for example, the right movable actuator 2008 is shown in its corresponding first position and the left movable actuator 2008 is shown in its corresponding second position, while in FIG. 21 the left movable actuator 2008 is shown in its corresponding first position and the right movable actuator 2008 is shown in its corresponding second position and in FIG. 22 both movable actuators 2008 are shown in their corresponding second positions. The first positions of the movable actuators 2008 may correspond, for example, to a default or unactuated state for the mechanism or mechanisms that are to be connected to the system and actuated by the movable actuators, while the second positions of the movable actuators 2008 may correspond to actuated states for the mechanism or mechanisms that are to be connected to the system and actuated by the movable actuators.

Also visible in FIGS. 20 through 22 are cam locks 2004 (or more correctly, keys that may be inserted into cam locks 2004 and then turned to transition the cam locks 2004 between locked and unlocked states). The cam locks 2004 are both shown in their unlocked states in FIGS. 20 through 22.

Figure 23:
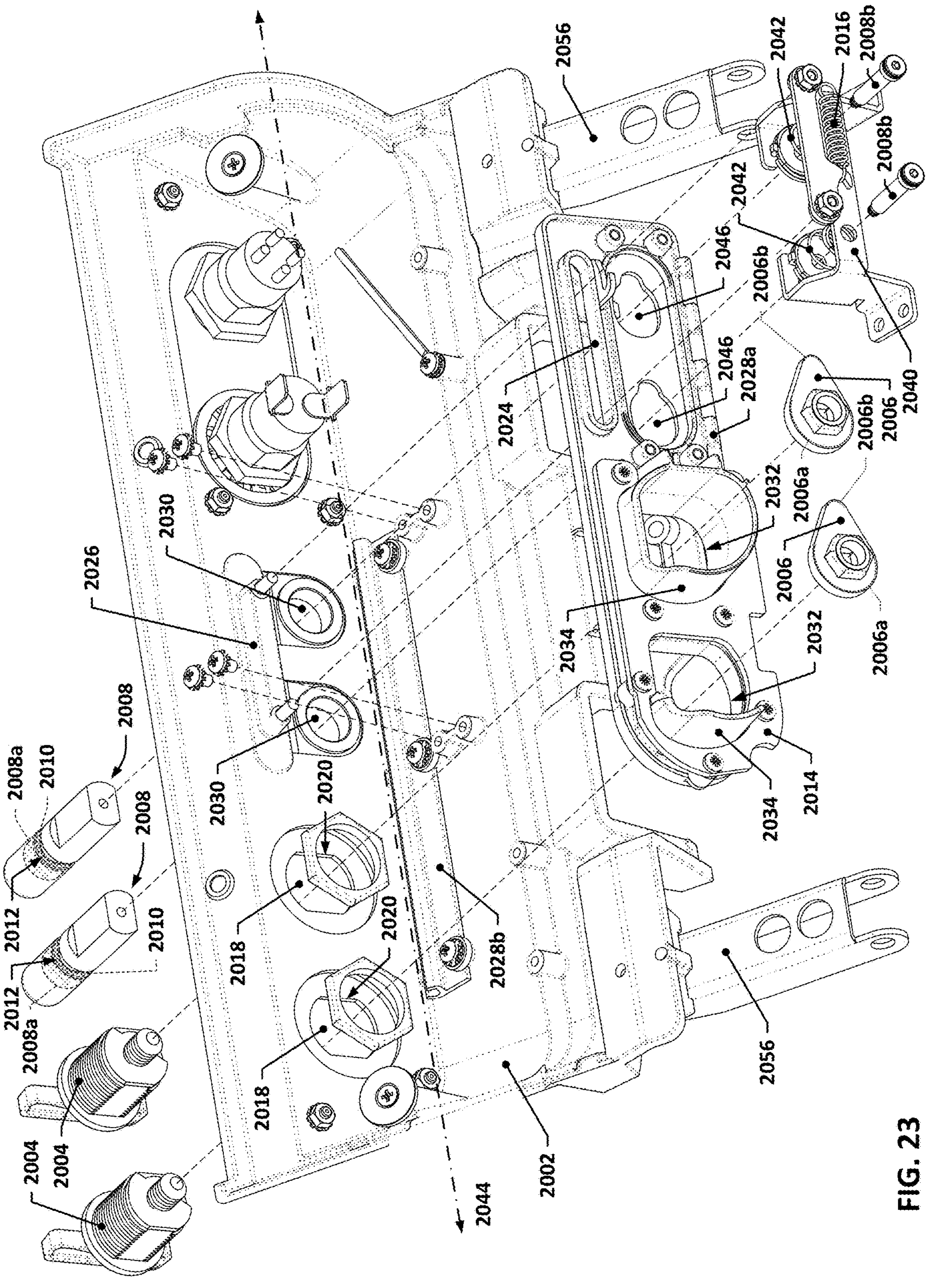
FIG. 23 depicts an exploded view of the multiple-actuator system with common locking element of FIGS. 20 through 22.

FIG. 23 depicts an exploded view of the multiple-actuator system with common locking element discussed above. As can be seen, the housing 2002 may be connected with hinge brackets 2056 or other hardware that may facilitate mounting the housing to a larger structure, such as a gaming machine cabinet. In the example system, there are two cam locks 2004 that are each able to be inserted through a corresponding cam lock aperture 2018 in the housing 2002. The cam lock apertures 2018 may, for example, be provided with keying features 2020, e.g., flats, notches, or other features that may interlock with corresponding features on the cam locks 2004 in order to rotationally lock the cam locks 2004 into place relative to the housing. In the depicted example, the cam locks 2004 each have a threaded main body that may be inserted through the corresponding cam lock aperture 2018. The cam locks 2004 may be secured in place in the cam lock apertures 2018 by corresponding threaded nuts (not called out, but visible in FIG. 23). Each cam lock 2004 may also have a threaded rotatable element (for example, the smaller-diameter threaded portion of the cam lock 2004) that may rotate about a corresponding rotational axis (coaxial with the center of the main body of that cam lock 2004, for example) relative to the main body when that cam lock 2004 is transitioned between the locked and unlocked states. Each cam lock 2004 may, for example, be connected with a corresponding cam element 2006 such that when that cam lock 2004 is transitioned between the locked and unlocked states, the corresponding cam element 2006 is caused to rotate about the corresponding rotational axis for that cam lock 2004 with the threaded rotatable element.

The cam elements 2006 may each have a corresponding proximal end surface **2006*a* and a corresponding distal end surface 2006*b*. The proximal end surface 2006*a* of each cam element 2006 may be positioned closer to the rotational axis for the corresponding cam lock 2004 than the corresponding distal end surface for that cam element 2006**.

Also visible in FIG. 23 are the movable actuators 2008 visible in FIGS. 20 through 22. Each movable actuator 2008 may include, for example, a stop surface 2010. The stop surfaces 2010 in this example are provided by circumferential channels 2012 that extend around the outer circumferences of the movable actuators 2008 but may be provided by other features in other implementations. In some implementations, for example, the stop surfaces 2010 may simply be the ends of the movable actuators 2008 that face toward the interior of the housing 2002 (the ends visible in FIG. 23) and the channels 2012 may be omitted. The housing 2002 may also include apertures 2030 that may be sized to receive the movable actuators 2008. The movable actuators 2008 may each include a first portion 2008*a*, e.g., located adjacent to the stop surfaces 2010 and positioned in between the stop surfaces 2010 and the ends of the movable actuators 2008 that extend outside of the housing 2002. The movable actuators 2008, in this case, also include second portions 2008*b*, e.g., shoulder screws, that extend through a support bracket 2040 that may be affixed to the housing 2002. Such an implementation may, for example, be used with some of the dual-latch mechanisms discussed earlier herein, with each second portion 2008*b* of the movable actuators 2008 being positioned so as to push against one of the first actuator 412*a* and the second actuator 412*b* of such a dual-latch mechanism, respectively, when the movable actuators 2008 are moved from the first position to the second position.

The system may also include actuator springs 2042 that may be compressed between the support bracket 2040 and remaining portions of the movable actuators 2008. The actuator springs 2042 may act to push or urge the movable actuators 2008 from the second positions to the first positions, thereby returning the movable actuators 2008 to their default positions when an external force, e.g., as provided by a human pressing on the movable actuators 2008 from the outside of the housing, is removed.

Also visible in FIG. 23 is a common locking element 2014 that may be connected with the housing 2002 via sliding interfaces, e.g., via a linear guide element 2028*a* on the common locking element 2014 and a corresponding linear guide element 2028*b* on the housing 2002, that may constrain motion of the common locking element 2014 relative to the housing 2002 to translation along a first axis 2044. In this example, an additional linear guide element may be provided in the form of limit post 2026 on the housing 2002 and slot 2024 on the common locking element 2014. The limit post 2026 may, for example, be an obround, raised feature that slots into the slot 2024 but is shorter in length than the slot 2024, thereby limiting the maximum amount of relative translation between the common locking element 2014 and the housing 2002 to the difference between the length of the limit post 2026 and the length of the slot 2024.

The common locking element 2014 may, for example, include a variety of different features designed to accommodate and/or interface with elements of the cam locks 2004 and the movable actuators 2008, as well as with elements fixedly connected with the housing 2002. As seen in FIG. 23, the common locking element 2014 may include a clearance aperture 2032 for each cam lock 2004, as well as a first open region 2046 for each movable actuator 2008. Also shown in FIG. 23 is a force-biasing device 2016, e.g., a spring, that may be connected at one end with the support bracket 2040 and at the other end with the common locking element 2014. The force-biasing device 2016 may, for example, urge the common locking element 2014 into either a first configuration or a second configuration relative to the housing 2002, depending on the design of the system. In this example, the force-biasing device 2016 is a tension spring that is configured to pull the common locking element 2014 away from the cam locks 2004. However, in other implementations, the force-biasing device 2016 may be another type of force-biasing device, e.g., a compressive spring, and/or may urge the common locking element 2014 towards the cam locks 2004 instead.

The common locking element 2014 may be able to simultaneously secure or release movable actuators 2008 depending on which configuration it is in. For example, in the first configuration, the common locking element 2014 may lock or secure the movable actuators 2008 against movement, and in the second configuration, the common locking element 2014 may allow or release the movable actuators 2008 to move relative to the housing 2002.

Figure 24:
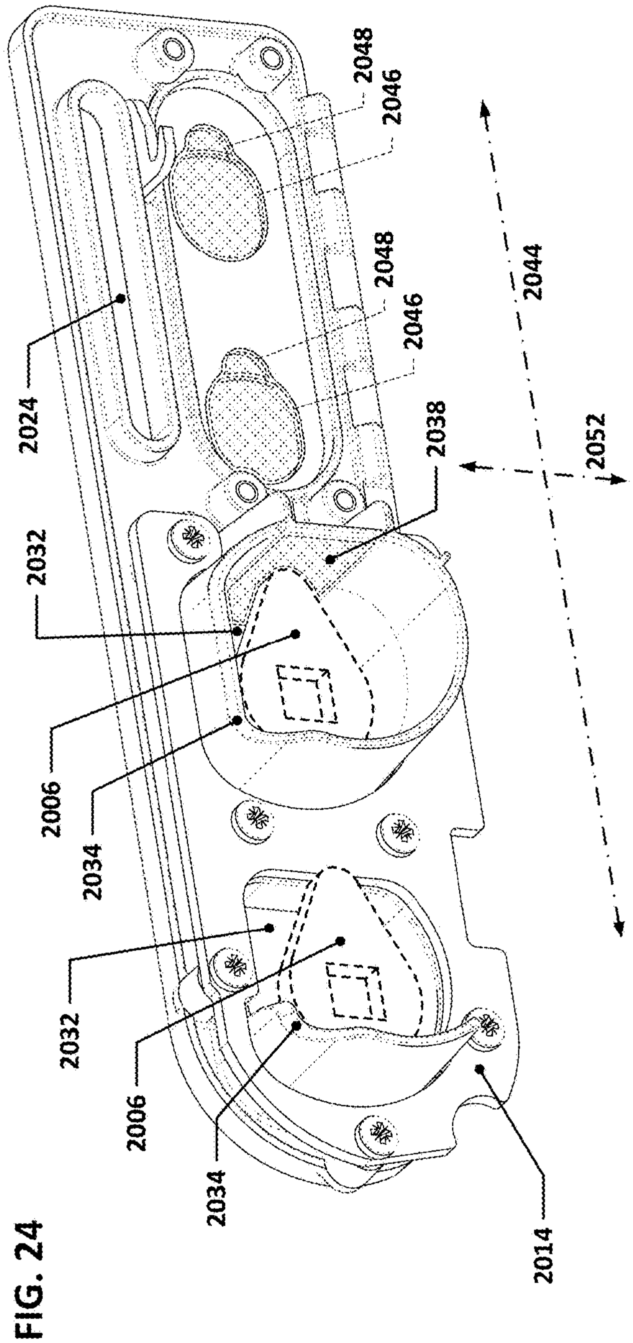
FIGS. 24 and 25 depict views of the common locking element in relative isolation.
Figure 25:
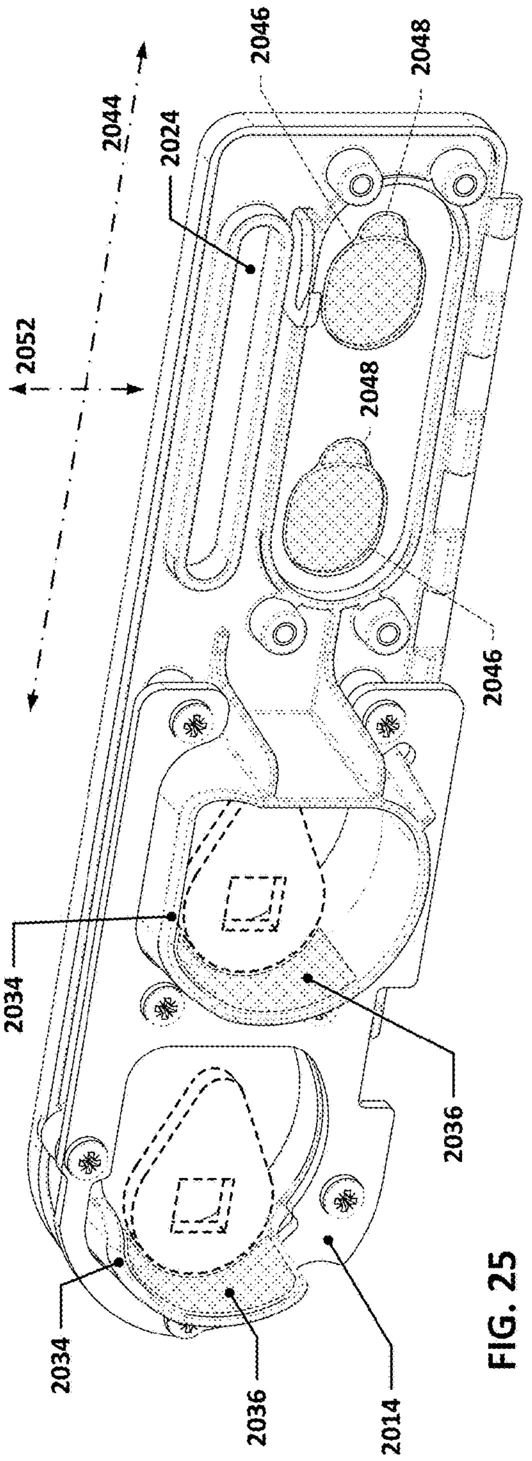

FIGS. 24 and 25 depict views of the common locking element 2014 in relative isolation; the housing 2002, the cam locks 2004, and the movable actuators 2008 are not shown, but the cam elements 2006 are still shown. As discussed above, the common locking element 2014 may include a corresponding first open region 2046 for each movable actuator 2008. In some implementations, such as that shown, the common locking element 2014 may additionally include a corresponding second open region 2048 for each movable actuator 2008. In such implementations, each first open region 2046 may be contiguous with the corresponding second open region 2048. The first open regions 2046 may be sized and positioned such that at least the first portion 2008*a* of each movable actuator 2008 may extend through a corresponding one of the first open regions 2046 when the common locking element 2014 is in the second configuration and that movable actuator 2008 is moved from the corresponding first position to the corresponding second position. For example, if the first portions 2008*a* of the movable actuators 2008 are generally cylindrical in shape, as in the depicted example, then the first open regions 2046 may be circular, rectangular, or obround regions having a minimum dimension, e.g., a width along a direction 2052 transverse to the first axis (and potentially perpendicular to the rotational axes of the cam locks 2004), that is greater than a diameter of the first portions 2008*a* of the movable actuators 2008. The second open regions 2048, if present, may similarly have a width along the direction 2052 that is at least smaller than the width of the first open regions 2046 along the direction 2052. Put another way, the stop surfaces 2010 of the movable actuators 2008 may be larger in size or maximum dimension along the direction 2052 than the second open regions 2048. Such an arrangement may, for example, allow edges defining the second open regions 2048 to engage with the stop surfaces 2010 on the movable actuators 2008 and secure the movable actuators 2008 when the common locking element 2014 is in the first configuration and the movable actuators 2008 are in their corresponding first positions. For example, the portions of the common locking element 2014 that define the perimeters of the second open regions 2048 may slot into the channels 2012 on the movable actuators 2008 when the common locking element 2014 is moved into the first configuration with the movable actuators 2008 in the first positions and may thus prevent the movable actuators 2008 from moving from their first positions, or at least from moving more than a predetermined amount (such as more than a millimeter, for example), until the common locking element 2014 is caused to move back into the second configuration.

In implementations in which the second open regions 2048 are omitted, the stop surfaces 2010 of the movable actuators 2008 may simply butt up against the common locking element 2014 to achieve a similar effect.

As also noted earlier, the common locking element 2014 may also include a clearance aperture 2032 for each cam lock 2004. The clearance apertures 2032 may, for example, be sized large enough to allow the common locking element 2014 to move between the first configuration and the second configuration without interference between the cam locks 2004 and the edges of the clearance apertures 2032. The common locking element 2014 may additionally include one or more walls 2034, each of which may be associated with, and positioned proximate to, one of the clearance apertures 2032. The walls 2034, or other structures providing similar functionality, may each have a corresponding first wall surface 2036 that is positioned proximate the corresponding clearance aperture 2032 for that wall 2034. The first wall surface(s) 2036 may, for example, provide a surface against which the cam element(s) 2006 may push when each cam lock 2004 is transitioned between at least one of the corresponding locked state and the corresponding unlocked state.

Figure 26:
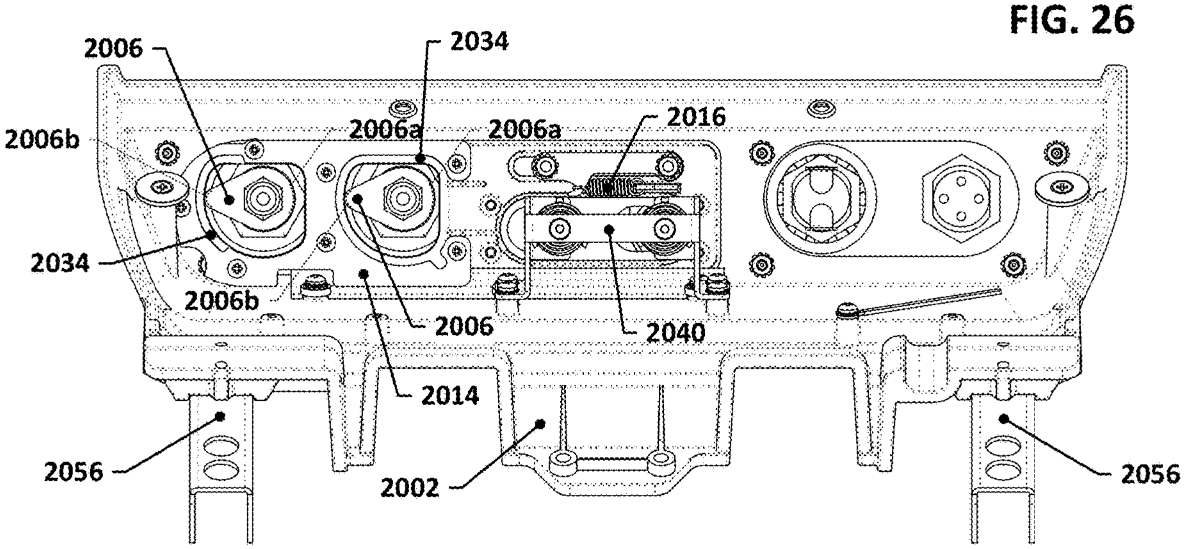
FIGS. 26 through 28 depict back views of the multiple-actuator system with common locking element during the transition of the common locking element from a first configuration to a second configuration.
Figure 27:
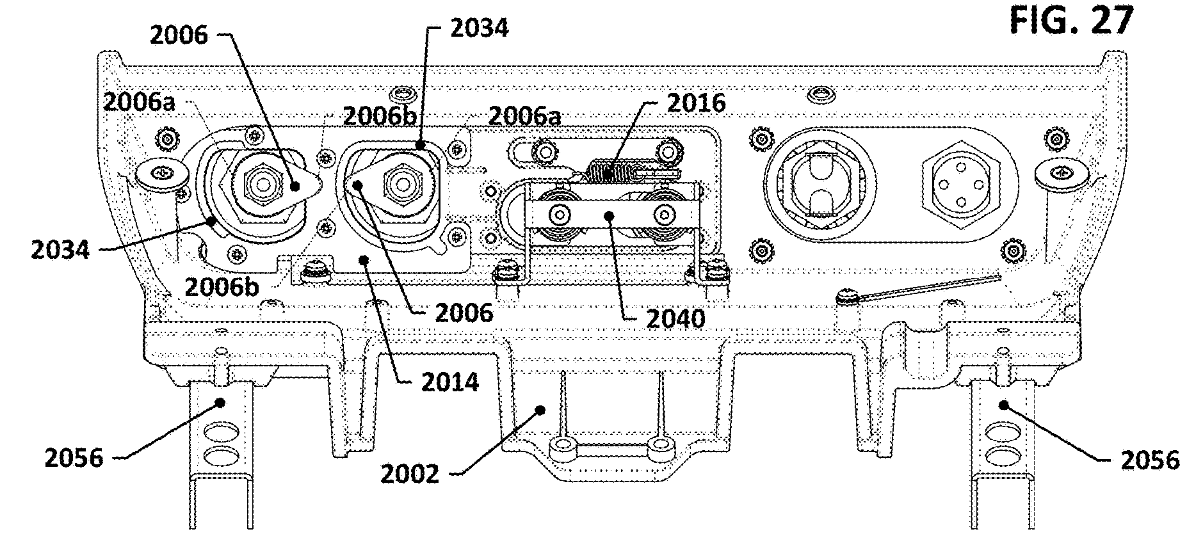
Figure 28:
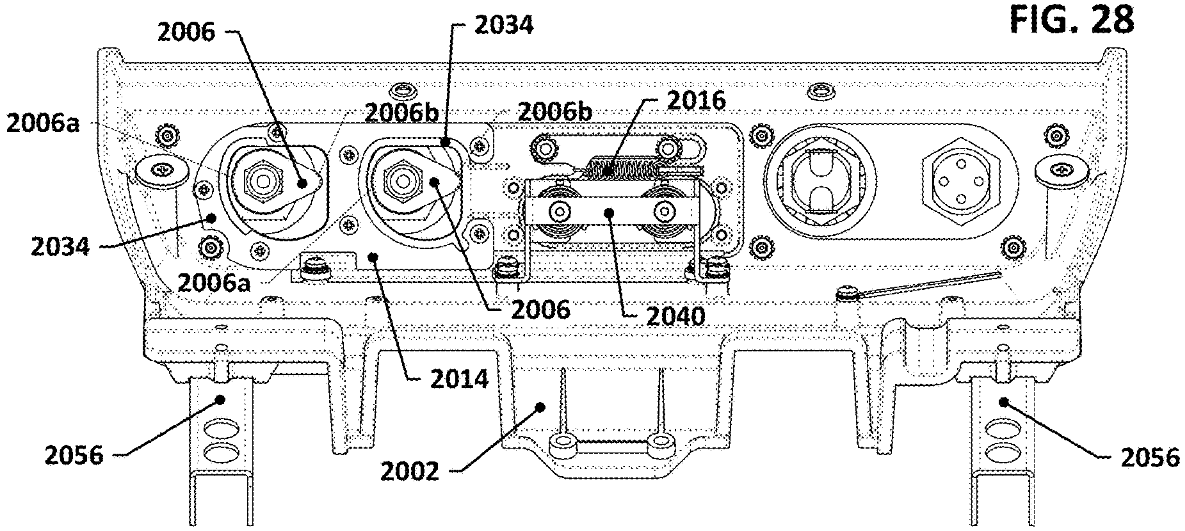

FIGS. 26 through 28 depict back views of the multiple-actuator system with common locking element during the transition of the common locking element 2014 from the first configuration to the second configuration. FIG. 26 shows the system with both cam locks 2004 in their corresponding locked states, with each corresponding cam element 2006 positioned such that the proximal end surface 2006*a* thereof is interposed between the corresponding distal end surface 2006*b* thereof and the movable actuators 2008. The force-biasing device 2016, in this example, is under tension and exerts a force on the common locking element 2014 to the left, urging it away from the movable actuators 2008, thereby pushing the common locking element 2014 into the first configuration that locks the movable actuators 2008 in place. However, the distal end surfaces 2006*b* of the cam elements 2006 are also in contact with (or will, if there is any movement of the common locking element 2014 towards the second configuration/movable actuators 2008, soon come into contact with) the corresponding first wall surfaces 2036 of the corresponding walls 2034 and thus further provide a stop mechanism that prevents the common locking element 2014 from moving towards the movable actuators 2008 (or at least, from moving the common locking element 2014 towards the movable actuators 2008 more than is shown in FIG. 26).

In FIG. 27, the cam lock 2004 closest to the outer edge of the housing 2002 has been caused to transition from its locked state to its unlocked state. This causes the corresponding cam element 2006 to rotate about the corresponding rotational axis. In this case, the amount of rotation of the cam element 2006 about the rotational axis is 180°, although in other implementations, the amount of rotation may be more or less than this (an example with cam locks 404 that rotate through 90° when transitioning between locked and unlocked states follows this discussion). It will be noted that the wall 2034 that is proximate to the clearance aperture 2032 for the outermost cam lock 2004 does not extend around into the region adjacent to that clearance aperture 2032 that is opposite the first wall surface 2036. Thus, the cam element 2006 for the outermost cam lock 2004 is able to transition from the locked state to the unlocked state without requiring any movement of the common locking element 2014.

In FIG. 28, the other cam lock 2004 has been caused to transition from the corresponding locked state to the corresponding unlocked state. In doing so, the distal end surface 2006*b* of the corresponding cam element 2006 is caused to rotate out of contact with the first wall surface 2036 of the wall 2034 that is proximate to the clearance aperture 2032 for that cam lock 2004. With neither cam element 2006 exerting a counteracting force on either of the first wall surfaces 2036, the distal end surface 2006*b* of the cam element 2006 of the cam lock closer to the movable actuators 2008 is able to push against a second wall surface 2038 (see FIG. 24) of the wall element 2034 as it rotates, acting as a cam that pushes the common locking element 2014 from the first configuration into the second configuration, thereby freeing both movable actuators 2008 from their secured positions and allowing the movable actuators to be transitioned from their first positions to their second positions responsive to actuation by an external force, e.g., an operator's finger pushing on the end of a movable actuator 2008 from the exterior of the housing 2002.

As shown in FIGS. 24 and 25, the wall element 2034 for the inner clearance aperture 2032 extends around all of that clearance aperture 2032 and includes a second wall surface 2038 that is proximate to that clearance aperture 2032, i.e., that clearance aperture 2032 is interposed between the corresponding first wall surface 2036 and the corresponding second wall surface 2038. The distance between the first wall surface 2036 for that clearance aperture 2032 and the second wall surface 2038 for that clearance aperture 2032 may, for example, be at least the maximum distance between the proximal end surface 2006*a* and the distal end surface 2006*b* of the corresponding cam element 2006. This may, for example, prevent binding between the cam element 2006 and the wall 2034 in some cases, e.g., where the cam elements 2006 may be rotated 180° or more as the corresponding cam locks 2004 are transitioned between the locked and unlocked states. However, the distance between the first wall surface 2036 for that clearance aperture 2032 and the second wall surface 2038 for that clearance aperture 2032 may, in some implementations, be only slightly greater, e.g., a millimeter or two, than the maximum distance between the proximal end surface 2006*a* and the distal end surface 2006*b* of the corresponding cam element 2006, thereby providing relatively little play in the position of the common locking element 2014 when in the first configuration or the second configuration. In other implementations, the distance between the first wall surface 2036 and the second wall surface 2038 may be less than the distance between the proximal end surface 2006*a* and the distal end surface 2006*b* of the corresponding cam element 2006—for example, in implementations in which the cam locks 2004 are quarter-turn cam locks, such a distance may be smaller.

In some such implementations, there may not be any contact between the distal end surface 2006*b* of the cam element 2006 and the first wall surface 2036 since the force-biasing device 2016 may pull the common locking element 2014 away from the distal end surface 2006*b* when the corresponding cam element 2006 is in the position shown in FIG. 26. However, any attempt to move the common locking element 2014 from the first configuration to the second configuration without first transitioning each cam lock 2004 from the corresponding locked state to the corresponding unlocked state will cause any first wall surface 2036 or first wall surfaces 2036 that are adjacent to cam elements 2006 where the corresponding cam locks 2004 are still in the corresponding locked states to collide with the distal end surfaces 2006*b* of such cam elements 2006, thereby halting further movement of the common locking element 2014 until such cam locks 2004 are caused to transition from their corresponding locked states to their corresponding unlocked states.

It will be appreciated that in at least some implementations in which the second wall surface 2038 is included, only one of the clearance apertures 2032 may have such an associated second wall surface 2038. For example, if both clearance apertures 2032 in FIGS. 26 through 28 were to have both first wall surfaces 2036 and second wall surfaces 2038, it would not be possible to place the system in the state shown in FIG. 27 since the second wall surface 2038 for the outer clearance aperture 2032 would collide with the distal end surface 2006*b* of the outer cam element but would not move since the inner cam element 2006 would press against the corresponding first wall surface 2036. It is still possible to transition the common locking element 2014 from the first configuration to the second configuration in such an implementation, but the cam elements 2006 in such an implementation must be caused to more or less rotate in synchrony in order to do so, which may undesirably complicate the process of locking or unlocking the movable actuators 2008. Having the second wall surface 2038 for only one of the clearance apertures 2032 may provide for simpler user operation since the outer and inner cam locks 2004 may be respectively transitioned from their locked states to their unlocked states without the need to operate the two cam locks 2004 in synchrony.

Figure 29:
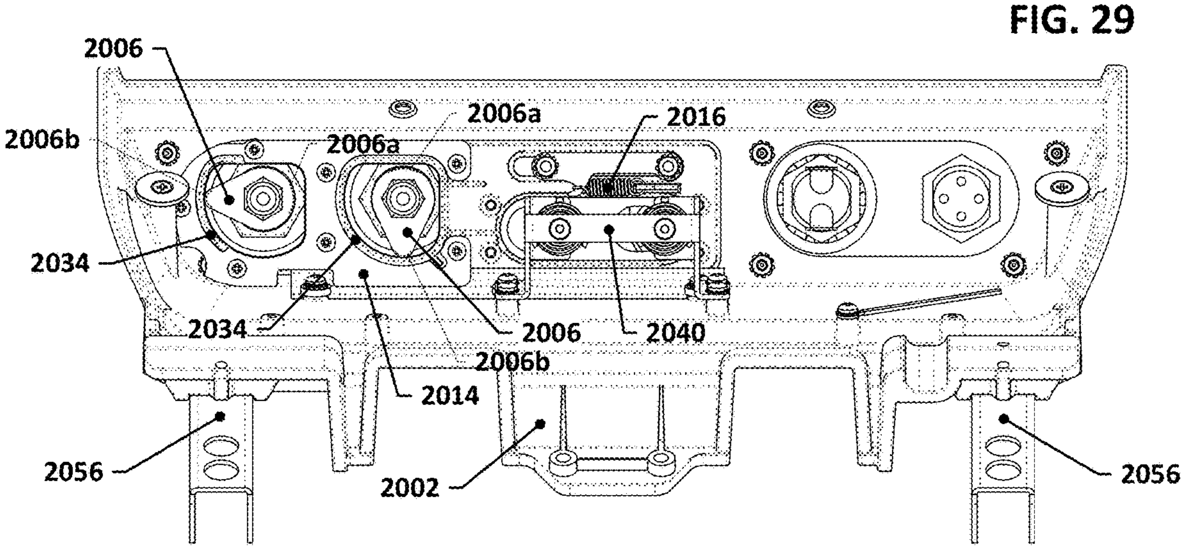
FIGS. 29 through 31 depict back views of an alternative implementation of the multiple-actuator system with common locking element during the transition of the common locking element from a first configuration to a second configuration.
Figure 30:
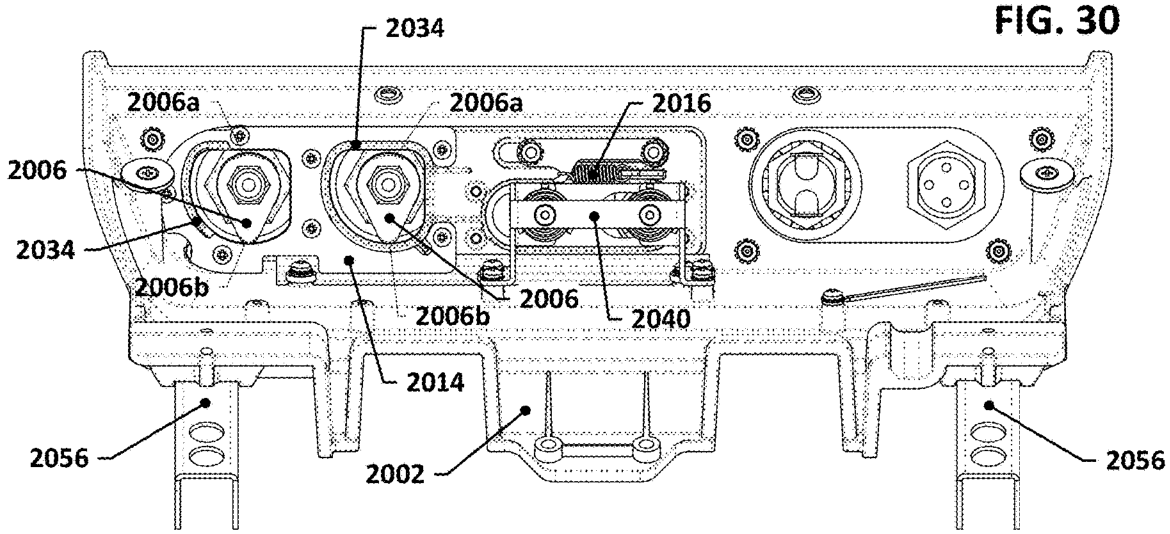
Figure 31:
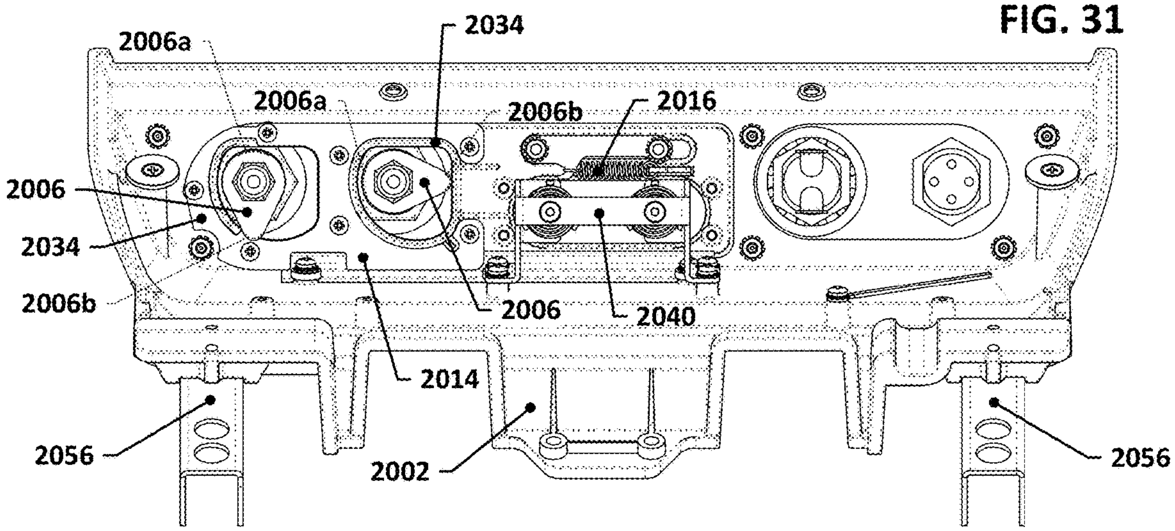

FIGS. 29 through 31 depict back views of an alternative implementation of the multiple-actuator system with common locking element during the transition of the common locking element from a first configuration to a second configuration. In the implementation shown in FIGS. 26 through 28, the cam locks 2004 are half-turn cam locks, i.e., cam locks that rotate through 180° when transitioning between the locked state and the unlocked state. The same multiple-actuator system may, however, also be used with quarter-turn cam locks. Such an implementation is shown in FIGS. 29 through 31.

FIG. 29 shows the system with both cam locks 2004 in their corresponding locked states. In this example, the cam elements 2006 are installed on the cam locks 2004 such that they are 90° out of phase with each other, with the corresponding cam element 2006 for the outer cam lock 2004 positioned such that the distal end surface 2006*b* thereof is positioned proximate the first wall surface 2036 of the wall element 2034 that is proximate the clearance aperture 2032 of the outer cam lock and the corresponding cam element 2006 for the inner cam lock 2004 positioned such that the distal end surface 2006*b* thereof is positioned pointing downward (or upward), e.g., approximately midway between the first wall surface 2036 and the second wall surface 2038 of the wall element 2034 that is proximate the clearance aperture 2032 of the inner cam lock.

In this implementation, the outer cam lock 2004 provides a positive stop that prevents movement of the common locking element 2014 from the first configuration to the second configuration. If an attempt is made to transition the inner cam lock 2004, for example, from the lock state to the unlocked state, the distal end surface 2006*b* of the cam element 2006 for the outer cam lock 2004 will contact the first wall surface 2036 that is proximate to the clearance aperture 2032 for the outer cam lock 2004 and prevent any movement (or movement beyond some small amount, e.g., due to assembly tolerances) of the common locking element 2014. The force-biasing device 2016 provides an independent source of locking the common locking element 2014 since it is configured to urge the common locking element 2014 into the first configuration even if neither cam lock 2004 is able to provide any positive stop mechanism that can prevent movement of the common locking element 2014.

In FIG. 30, the outer cam lock 2004 has been caused to transition from its locked state to its unlocked state. This causes the corresponding cam element 2006 to rotate about the corresponding rotational axis. In this case, the amount of rotation of the cam element 2006 about the rotational axis is 90°, thereby placing the two cam elements 2006 that are shown in the same rotational position, e.g., the rotational positions of the cam elements 2006 relative to the housing 2002 are the same for the outer cam lock 2004 in the unlocked state and the inner cam lock 2004 in the locked state. In doing so, the distal end surface 2006*b* of the cam element 2006 for the outer cam lock 2004 is rotated out of a position where it can contact the first wall surface 2036 for the outer cam lock 2004 and thus no longer is able to act as a mechanical stop that will prevent the common locking element 2014 from being transitioned from the first configuration to the second configuration.

It will be noted that the wall element 2034 that is proximate to the clearance aperture 2032 for the outermost cam lock 2004 does not extend around the bottom of the clearance aperture 2032, e.g., the region adjacent to that clearance aperture 2032 that is beneath the outer cam lock 2004 (if the cam element 2006 were to instead rotate in the opposite direction, then the wall element 2034 may similarly not extend into a region that is above the outer cam lock 2004. Thus, the cam element 2006 for the outermost cam lock 2004 is able to transition from the locked state to the unlocked state without requiring any movement of the common locking element 2014.

In FIG. 31, the inner cam lock 2004 has been caused to transition from the corresponding locked state to the corresponding unlocked state. In doing so, the distal end surface 2006*b* of the corresponding cam element 2006 is caused to rotate into contact with the second wall surface 2038 of the wall element 2034 that is proximate to the inner clearance aperture 2032 for the inner cam lock 2004.

With the cam element 2006 for the outer cam lock 2004 no longer exerting a counteracting force on the first wall surface 2036 of the outer clearance aperture 2032, the distal end surface 2006*b* of the cam element 2006 of the inner cam lock 2004 is able to push against the second wall surface 2038 of the wall element 2034 as it rotates, thereby acting, as explained earlier, as a cam that pushes the common locking element 2014 from the first configuration into the second configuration, thereby freeing both movable actuators 2008 from their secured positions and allowing the movable actuators to be transitioned from their first positions to their second positions responsive to actuation by an external force.

It will be understood that in the implementations shown and discussed herein, the multiple-actuator system with common locking element may utilize a single cam lock or multiple cam locks, such as the two-cam-lock system discussed above, or in systems that use three or more cam locks.

It will also be appreciated that the force-biasing device 2016 may be configured to instead urge the common locking element 2014 into the second configuration rather than into the first configuration. Thus, for example, the force-biasing device 2016 may urge the system into a state where the movable actuators 2008 can be freely moved, instead of into a state where the movable actuators 2008 are interlocked with the common locking element 2014 and prevented from moving. In either case, the cam elements 2006 and cam locks 2004 may still be used to cause the common locking element 2014 to move between the first and second configurations.

When multiple cam locks 2004 are used in such a system, each such cam lock 2004 may need to be transitioned from its locked state to its unlocked state in order to release the common locking element 2014. This allows for a multi-key security approach to be used, in which multiple, e.g., two, individuals are each assigned a different key that may be used to lock or unlock a different one of multiple cam locks 2004. Each of those different individuals must then insert their respective key into the corresponding cam lock 2004 and turn the corresponding cam lock 2004 in order to completely unlock the movable actuators. In some implementations, such as that shown in the Figures discussed above, there may be only two cam locks 2004, but in other implementations, there may be more than two cam locks 2004, e.g., three cam locks 2004, such that three different keys may be required in order to unlock the movable actuators.

Figure 32:
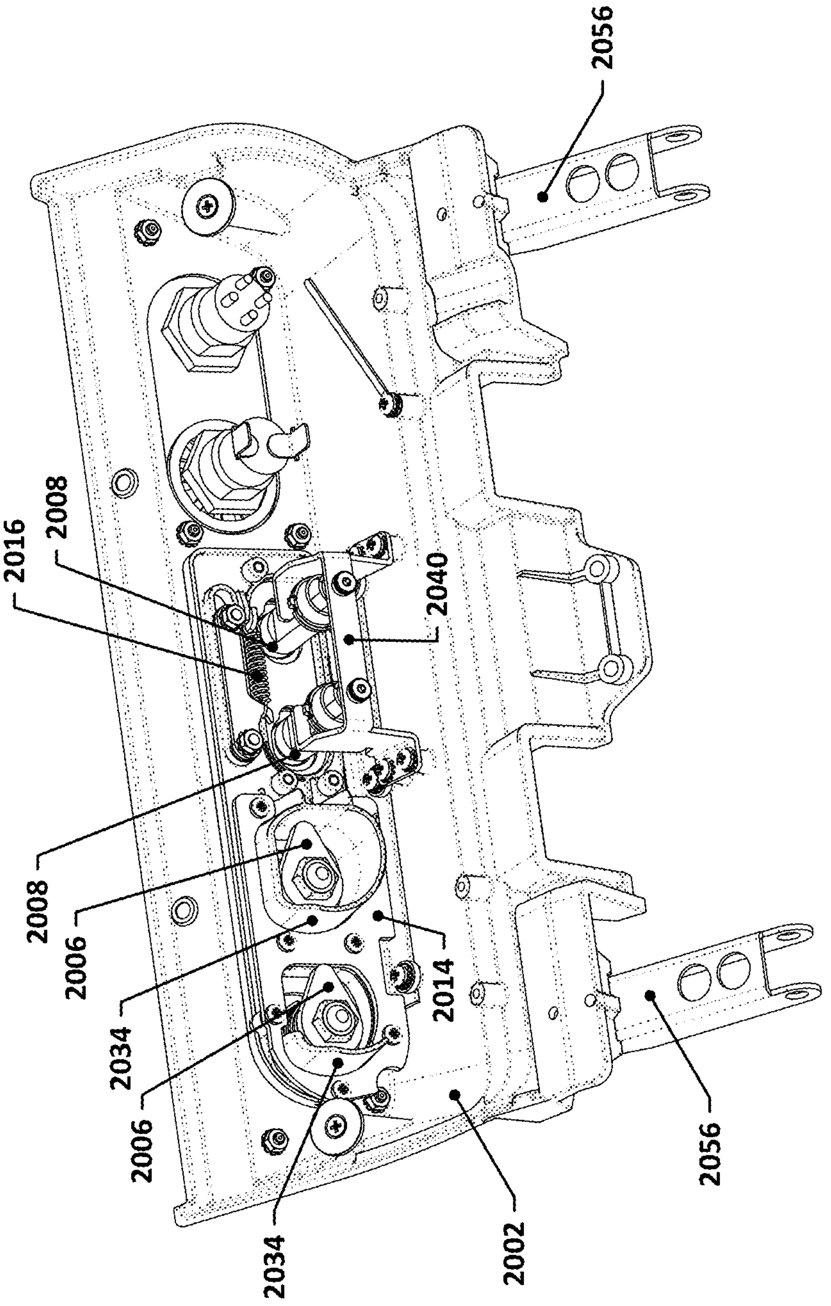
FIGS. 32 through 35 depict the system of FIGS. 20 through 28 with the common locking element in the second configuration but with movable actuators shown in various states of operation (or non-operation).
Figure 33:
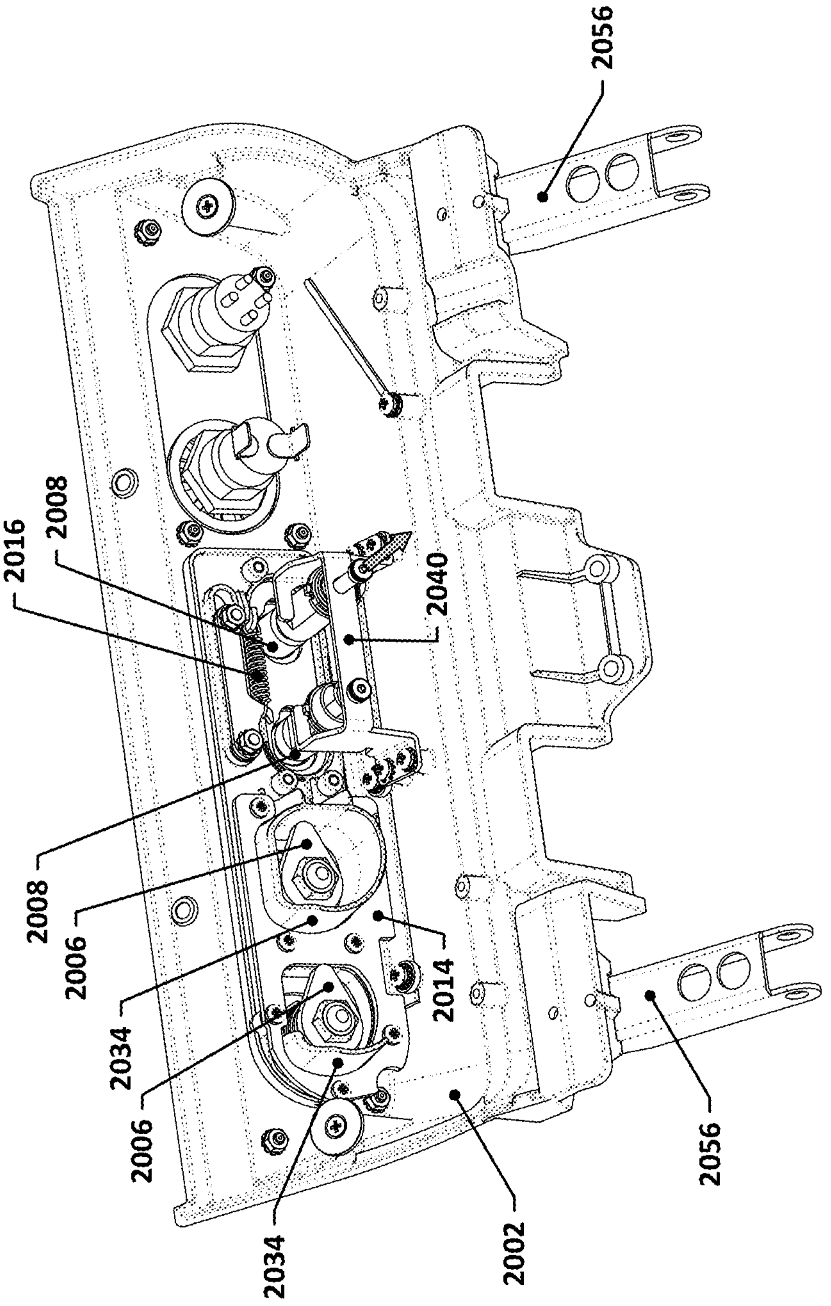
Figure 34:
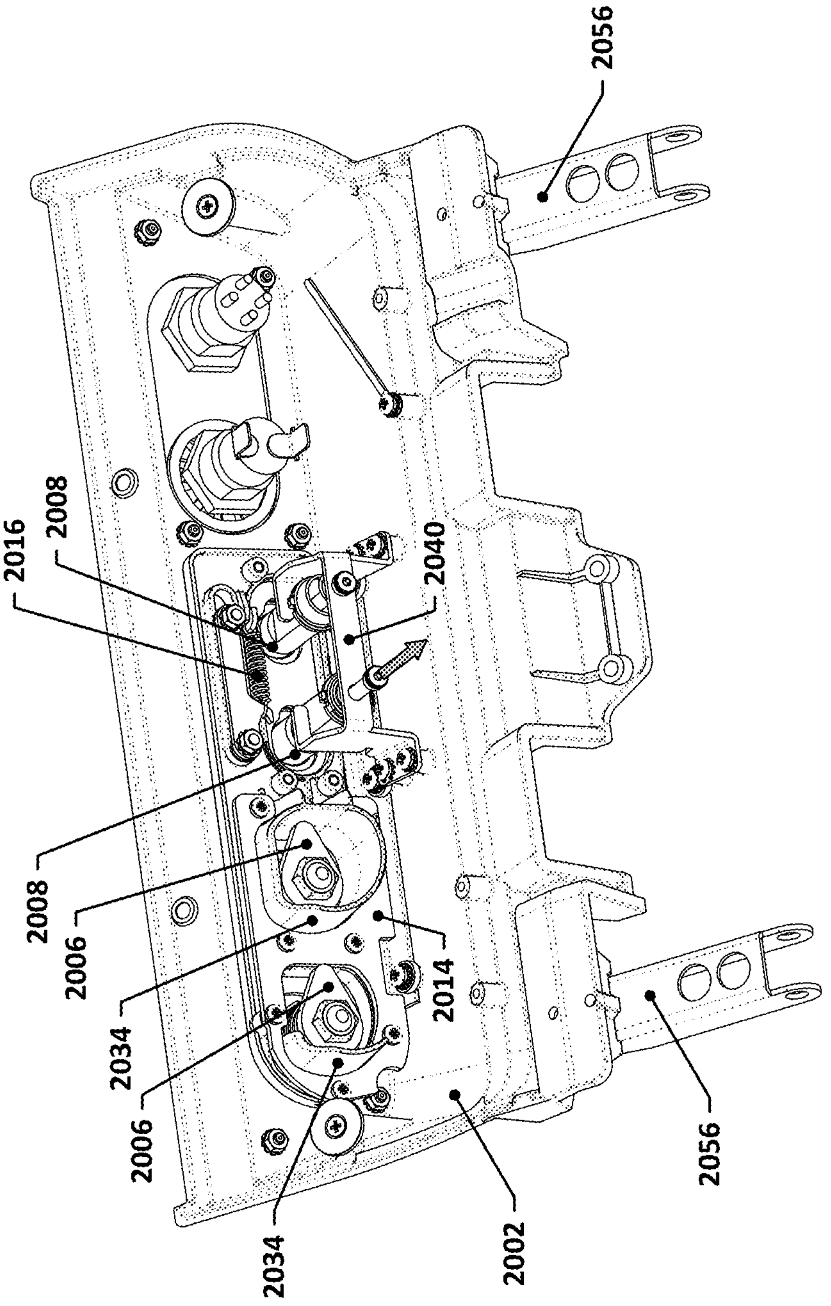
Figure 35:
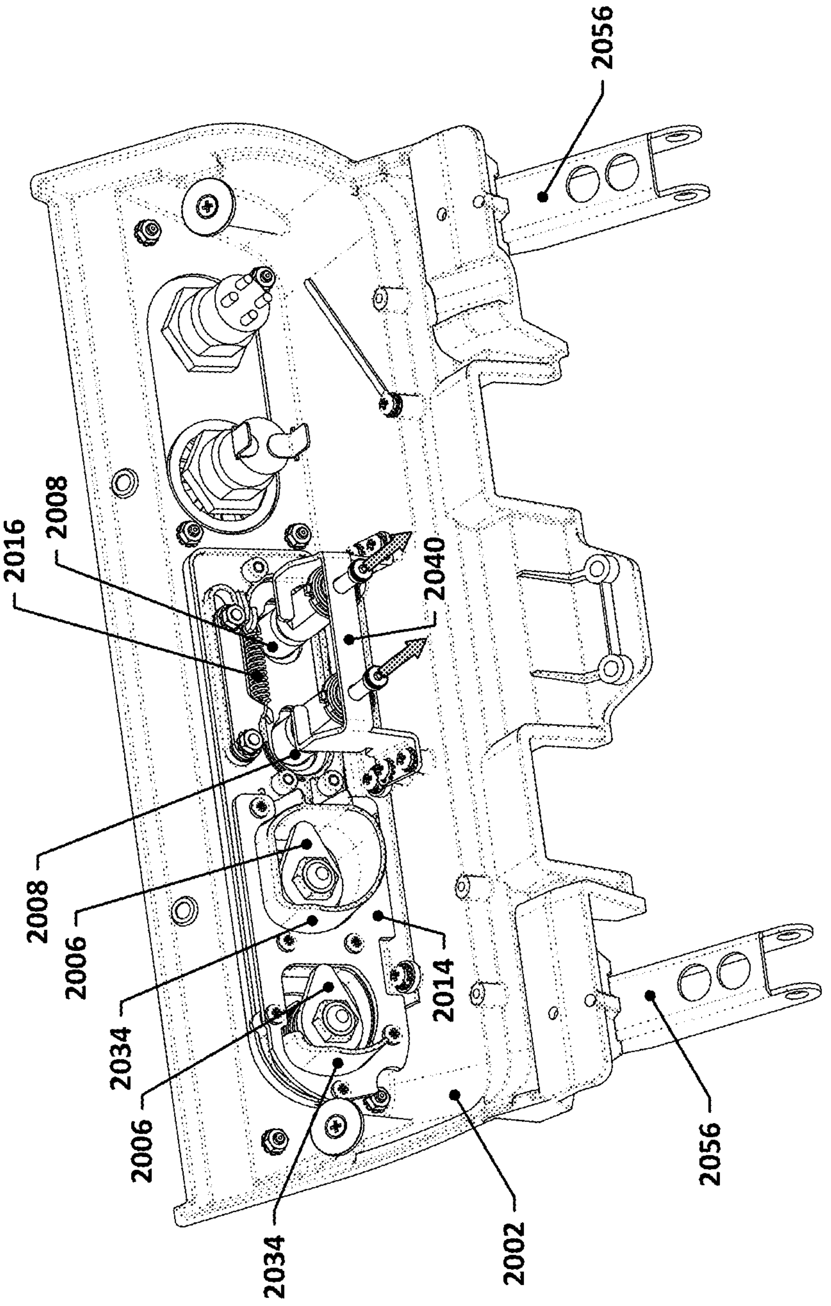

FIGS. 32 through 35 depict the system of FIGS. 20 through 28 with the common locking element 2014 in the second configuration, e.g., as shown in FIG. 28, but with the movable actuators 2008 shown in various states of operation (or non-operation). For example, FIG. 32 shows the system with the movable actuators 2008 unrestrained but also unactuated, e.g., as they would be with no external force applied to them. FIG. 33, however, shows the second portion of the movable actuator 2008 furthest from the cam locks 2004 extended outward, reflecting the fact that this movable actuator 2008 has been caused to move into the second position (e.g., as shown in FIG. 20). Similarly, FIG. 34 shows the second portion of the movable actuator 2008 closest to the cam locks 2004 extended outward, corresponding to the movable actuator state shown in FIG. 21, while FIG. 35 shows the second portions of both movable actuators 2008 extended outward, corresponding to the movable actuator state shown in FIG. 22.

Figure 36:
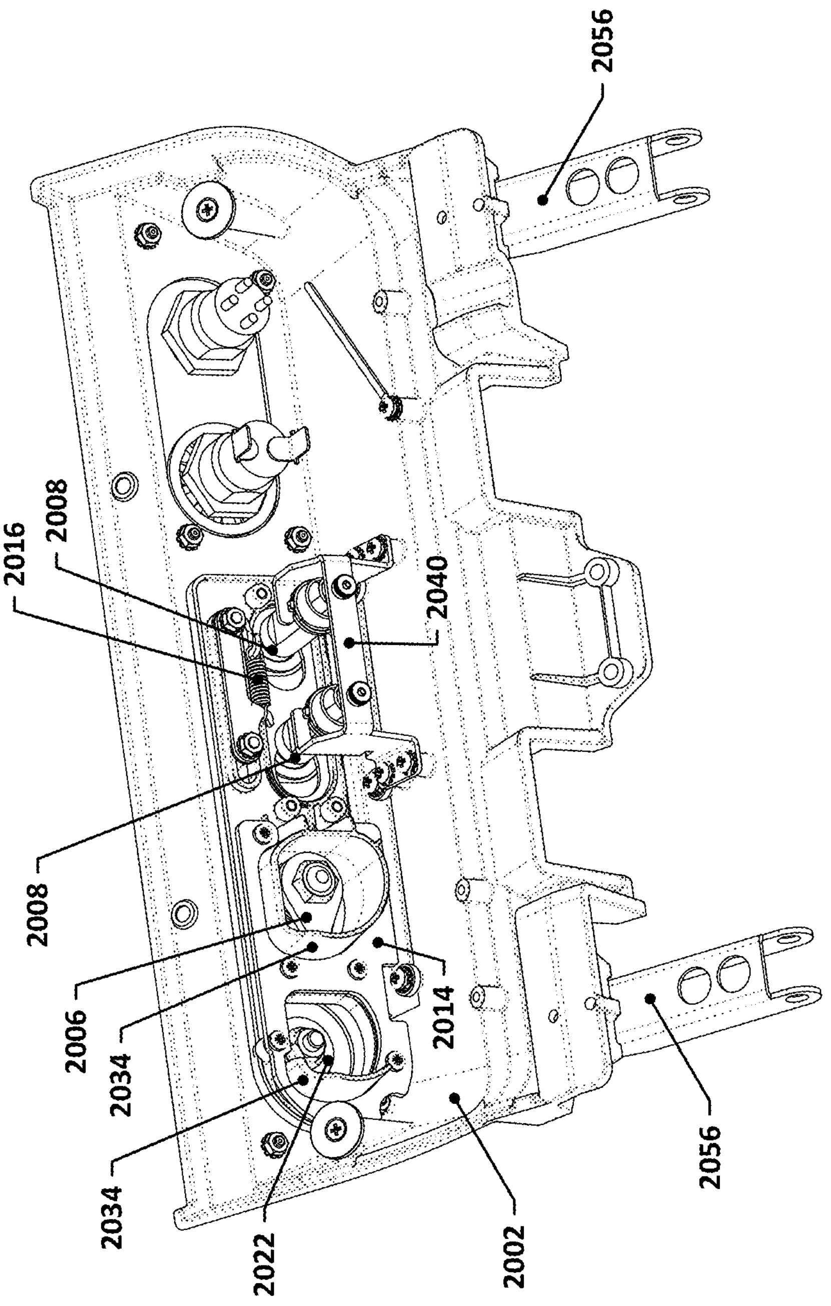
FIG. 36 depicts a system that is identical to that shown in FIGS. 32 through 35 except that an outermost cam lock aperture does not have a cam lock installed.

It will be appreciated that the multiple-actuator systems discussed above may have multiple cam locks 2004, as shown, but may also be made so as to have only a single cam lock 2004. In some implementations, however, such systems may be provided with more cam lock apertures 2018 than there are installed cam locks 2004. FIG. 36 depicts such a system and is identical to that shown in FIGS. 32 through 35 except that the outermost cam lock aperture 2018 does not have a cam lock 2004 installed. Instead, a lock blank 2022 has been installed in the unused cam lock aperture 2018. The lock blank 2022 may, for example, be a flat or featureless disk or cap that may completely cover the unused cam lock aperture 2018 on the exterior of the housing 2002 and may, as shown, be secured by a nut or other fastener on the interior side of the housing 2002. Thus, the lock blank may be easily removed using a socket wrench when the interior of the housing 2002 is accessible (as it may be when the system has been used to gain access into the interior of a gaming machine) but may generally prevent any access to the interior of the housing 2002 via the unused cam lock aperture 2018 when installed. Such an arrangement may allow an operator of a device that incorporates such a system to easily modify the system to feature multiple-lock capability if extra security or access control is desired.

It will also be appreciated that the height of the walls 2034, as shown, exceed the height needed in order to engage with the cam elements 2006 as shown. In some implementations, the walls 2034 may be made to have a height of at least 1 inch, e.g., 1.125" inches. This may allow for cam locks 2004 having a wide range of main body lengths to be used with such a system, thereby allowing operators of devices that incorporate such systems wide latitude in selecting cam locks 2004 that may be installed in such systems. For example, a first operator of devices incorporating such systems may desire to use a particular model of cam lock that is dimensioned to place the cam elements 2006 at a first height, while a second operator of such devices may desire to use a different model of cam lock that is dimensioned to place the cam elements 2006 at a second height different from the first height. Making the walls 2034 (and thus the first wall surfaces 2036 and/or the second wall surfaces 2038) such that they have a particular minimum height allows such systems to accommodate a wide range of customer needs with respect to cam lock selection.

Figure 37:
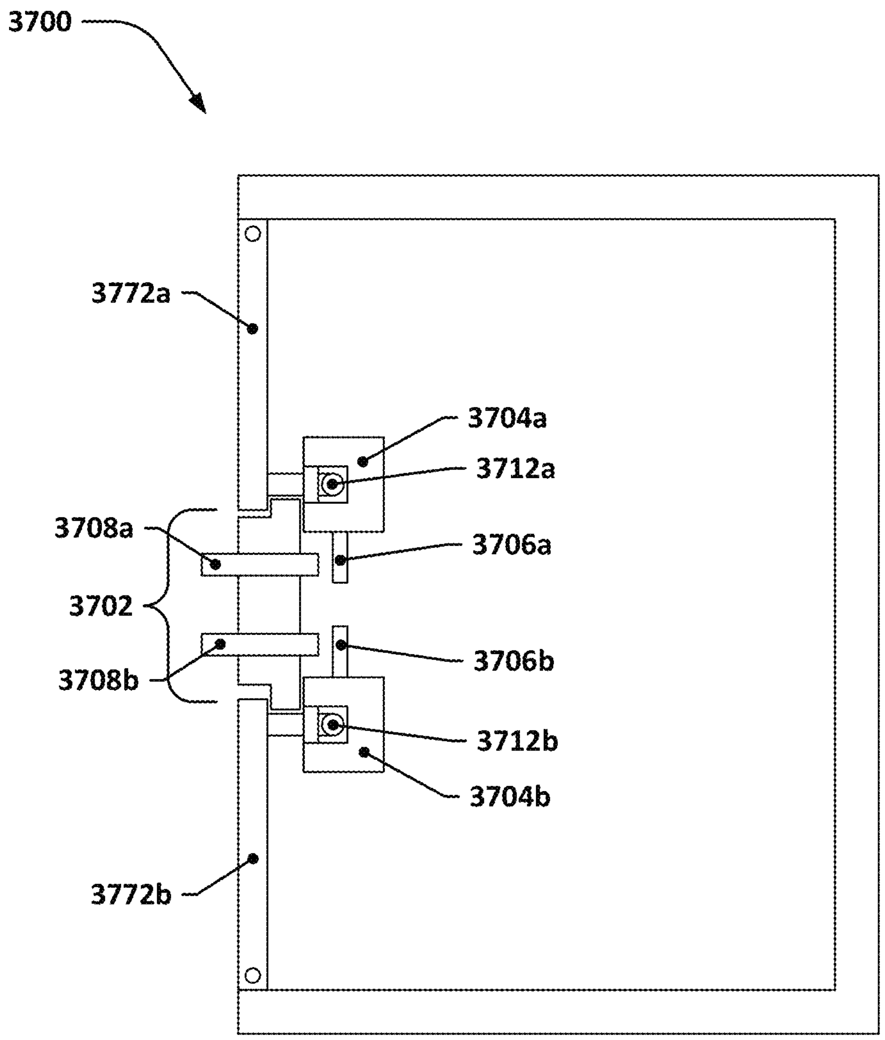
FIG. 37 depicts a schematic of an example implementation of a multiple-actuator system installed in a gaming machine cabinet.

It will be understood that multiple-actuator systems such as those described above, as noted earlier, may be used in tandem with the dual-latch mechanisms discussed herein or with other types of mechanically operated systems. FIG. 37 depicts a schematic of an example implementation of a multiple-actuator system such as that discussed above. For example, FIG. 37 depicts a gaming machine cabinet 3700 that includes two movable access control elements **3772*a* and 3772*b*. The movable access control elements 3772*a* and 3772*b* may, for example, be doors, trays, or other mechanisms that may generally be transitioned between "opened" and "closed" states. In this example, the movable access control elements 3772*a* and 3772*b* are doors that are configured to pivot outwards about hinge posts located at opposing ends of the movable access control elements 3772*a* and 3772*b***.

The gaming machine cabinet 3700 also includes a multiple-actuator system housing 3702 that includes two movable actuators **3708*a* and 3708*b*. The housing 3702** also includes the various other elements discussed above, such as cam locks, the common locking element, etc. These additional elements are omitted in this schematic to avoid undue clutter.

The gaming machine cabinet 3700 may also include a latching mechanism with a first set of one or more latches **3704*a* and a second set of one or more latches 3704*b*. The latches in each set of latches 3704*a* and 3704*b* may each be configured to be transitionable between corresponding latched and unlatched states. The first set of one or more latches 3704*a* may, when latched to a latch strike 3712*a* for the first movable access control element 3772*a*, secure the first movable access control element 3772*a* in a closed position. When the first set of one or more latches 3704*a* is caused to transition from the latched state to the unlatched state with the first movable access control element 3772*a* in the closed position, the first set of one or more latches 3704*a* may release the first movable access control element 3772*a*** and allow it to be transitioned to the open position.

Similarly, the second set of one or more latches **3704*b* may, when latched to a latch strike 3712*b* for the second movable access control element 3772*b*, secure the second movable access control element 3772*b* in a closed position. When the second set of one or more latches 3704*b* is caused to transition from the latched state to the unlatched state with the second movable access control element 3772*b* in the closed position, the second set of one or more latches 3704*b* may release the second movable access control element 3772*b*** and allow it to be transitioned to the open position.

The movable actuators **3708*a* and 3708*b* may each be positioned and configured so as to contact a respective movable element or elements (such as triggers 3706*a* or 3706*b*) in the first set of one or more latches 3704*a* and the second set of one or more latches 3704*b***, respectively, when actuated, thereby causing the latch or latches in those respective sets of one or more latches to transition from the latched states to the unlatched states.

Figure 38:
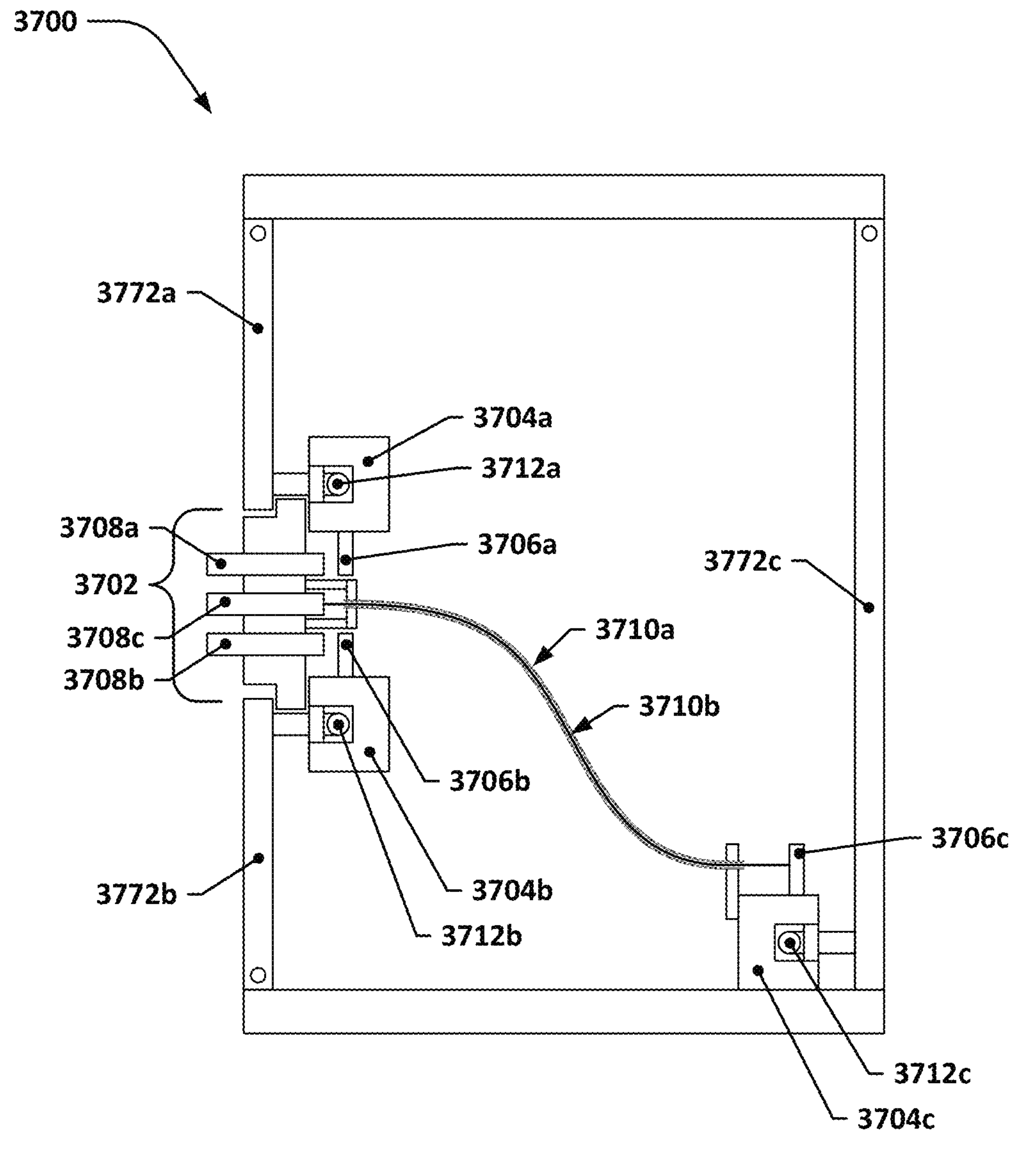
FIG. 38 depicts a schematic of another example implementation of a multiple-actuator system installed in a gaming machine cabinet.

FIG. 38 depicts a schematic of another implementation in which a multiple-actuator system may be used. The implementation of FIG. 38 is the same as that of FIG. 37 except that there is a third movable access control element 3772*c* that is similarly secured by a third set of one or more latches 3704*c* that latches to a latch strike 3712*c* that is connected with the third movable access control element 3772*c*. The third set of one or more latches 3704*c* is remote from the multiple-actuator system, e.g., positioned more than 12" therefrom, and is linked to a third movable actuator 3708*c* of the multiple-actuator system via a mechanical cable drive that has a tubular guide 3710*a* that may be fixed at either end with respect to the housing 3702 and the third set of one or more latches 3704*c*. The mechanical cable drive may also include a flexible inner core 3710*b*, e.g., a braided steel cable, that extends through the tubular guide 3710*a* and is connected at one end with the movable actuator 3708*c* and at the other end with a trigger or triggers 3706*c* of the third set of one or more latches 3704*c*.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An apparatus comprising:
- a housing;
- a set of one or more cam locks;
- a set of two or more movable actuators, each movable actuator configured to be movable between a corresponding first position and a corresponding second position; and
- a common locking element movable between a first configuration and a second configuration relative to the housing, wherein:
  - the common locking element, when in the first configuration and when each movable actuator is in the corresponding first position, interlocks with each movable actuator and prevents each movable actuator from being moved from the corresponding first position to the corresponding second position,
  - the common locking element, when in the second configuration, does not interlock with each movable actuator and allows each movable actuator to be moved from the corresponding first position to the corresponding second position,
  - each cam lock in the set of one or more cam locks is transitionable between a locked state and an unlocked state, and
  - the set of one or more cam locks is configured to cause the common locking element to be in one or both of: a) the first configuration when at least one cam lock in the set of one or more cam locks is in the locked state and b) the second configuration when each cam lock in the set of one or more cam locks is in the unlocked state.

2. The apparatus of claim 1, wherein the set of one or more cam locks is configured to cause the common locking element to be in the first configuration when at least one cam lock in the set of one or more cam locks is in the locked state.

3. The apparatus of claim 2, further comprising a force-biasing device that is configured to urge the common locking element into the second configuration.

4. The apparatus of claim 1, wherein the set of one or more cam locks is configured to cause the common locking element to be in the second configuration when each cam lock in the set of one or more cam locks is in the unlocked state.

5. The apparatus of claim 4, further comprising a force-biasing device that is configured to urge the common locking element into the first configuration.

6. The apparatus of claim 1, further comprising one or more lock blanks, wherein:
- the housing includes two or more cam lock apertures, each cam lock aperture configured to receive one of the one or more cam locks;
- there is at least one less cam lock in the set of one or more cam locks than there are cam lock apertures;
- each cam lock in the set of one or more cam locks is installed in one of the cam lock apertures; and
- each lock blank of the one or more lock blanks is installed in one of the cam lock apertures that does not have one of the one or more cam locks installed therein.

7. The apparatus of claim 6, wherein the two or more cam lock apertures includes only two cam lock apertures and the one or more cam locks includes only one cam lock.

8. The apparatus of claim 1, further comprising a force-biasing device that is configured to urge the common locking element into either the first configuration or the second configuration.

9. The apparatus of claim 8, wherein the common locking element is constrained to slide along a first axis relative to the housing.

10. The apparatus of claim 9, wherein:

the common locking element has a corresponding first open region for each movable actuator, the first open regions are sized and positioned such that at least a first portion of each movable actuator passes through a corresponding one of the first open regions when the common locking element is in the second configuration and that movable actuator is transitioned from the corresponding first position to the corresponding second position, and the common locking element prevents movement of the first portions of the movable actuators from passing through the corresponding first open regions when the common locking element is in the first configuration.

11. The apparatus of claim 10, wherein:

the common locking element also has a corresponding second open region for each movable actuator, the corresponding first open region and the corresponding second open region for each movable actuator form a corresponding contiguous open region, the corresponding second open region for each movable actuator is narrower in width in a direction transverse to the first axis than the corresponding first open region for that movable actuator, and relative positioning of the corresponding first open region and the corresponding second open region for each of the movable actuators is the same.

12. The apparatus of claim 11, wherein each movable actuator:

extends through a corresponding aperture in the housing, extends through the corresponding first open region for that movable actuator when that movable actuator is in the second position and the common locking element is in the second configuration, and has a stop surface interposed between a portion of the housing through which that movable actuator extends and the common locking element when that movable actuator is in the first position, wherein the stop surface is larger in size in the direction transverse to the first axis than the corresponding first open region of that movable actuator.

13. The apparatus of claim 11, wherein each movable actuator has one or more channels that, when the common locking element is in the first configuration, each receive a portion of the common locking element that defines, at least in part, a perimeter of the corresponding second open region for that movable actuator, the channels thereby interlocking with the common locking element and preventing movement of the movable actuators relative to the housing beyond a first amount.

14. The apparatus of claim 4, wherein:

each cam lock has a corresponding cam element having a proximal end surface and a distal end surface, the corresponding cam element of each cam lock is configured to rotate about a corresponding rotational axis when that cam lock is transitioned between the locked state and the unlocked state, the distal end surface of each cam element is positioned farther from the rotational axis about which that cam element is configured to rotate than is the proximal end surface of that cam element, the common locking element includes a corresponding clearance aperture for each cam lock, the set of one or more cam locks includes a first cam lock, the common locking element includes a first wall surface positioned proximate to the corresponding clearance aperture for the first cam lock, and the first wall surface is positioned proximate the corresponding clearance aperture for the first cam lock such that the distal end surface of the cam element of the first cam lock is configured to at least push against the first wall surface when the first cam lock is either: a) transitioned from the corresponding locked state to the corresponding unlocked state or b) transitioned from the corresponding unlocked state to the corresponding locked state.

15. The apparatus of claim 14, wherein:

the common locking element further includes a second wall surface positioned proximate to the corresponding clearance aperture for the first cam lock, and the corresponding clearance aperture for the first cam lock is interposed between the first wall surface and the second wall surface.

16. The apparatus of claim 15, wherein the first wall surface and the second wall surface corresponding to the first cam lock are spaced apart by a distance greater than or equal to a distance between the proximal end surface and the distal end surface of the corresponding cam element for the first cam lock.

17. The apparatus of claim 15, wherein:

the common locking element includes a plurality of clearance apertures, the common locking element includes a corresponding first wall surface for each clearance aperture, and each clearance aperture other than the first clearance aperture does not have a corresponding second wall surface positioned proximate thereto.

18. The apparatus of claim 1, further comprising:

a cabinet;

a remote device located within the cabinet and at least 12" from the housing; and a mechanical cable drive including a tubular guide sleeve and a flexible inner core, wherein:

the flexible inner core extends through the tubular guide sleeve, a first end of the tubular guide sleeve is fixed with respect to the housing, a second end of the tubular guide sleeve is fixed with respect to a first portion of the remote device, a second end of the flexible inner core is configured to connect with a second portion of the remote device that is movable with respect to the first portion of the remote device, and one of the movable actuators is configured to interface with a first end of the flexible inner core to cause the flexible inner core to slide along an interior of the tubular guide sleeve when that movable actuator is caused to transition from the first position to the second position, thereby causing the second portion of the remote device to move relative to the first portion of the remote device.

19. The apparatus of claim 18, wherein:

the remote device is a latch configured to be transitionable from a latched state and an unlatched state responsive to movement of the first portion of the remote device relative to the second portion of the remote device, the latch is configured to secure an access control element when the access control element is in a closed position and the latch is in the latched state, and the latch is configured to release the access control element when the access control element is in the closed position and the latch is caused to transition from the latched state to the unlatched state.

20. The apparatus of claim 1, further comprising:

a cabinet;

a first movable access control element;

a second movable access control element; and a latching mechanism with a first set of one or more latches and a second set of one or more latches, wherein:

each latch in the first set of one or more latches is configured to be transitioned between a corresponding latched state and a corresponding unlatched state, each latch in the second set of one or more latches is also configured to be transitioned between a corresponding latched state and a corresponding unlatched state, the first set of one or more latches secures the first movable access control element when the first movable access control element is in a corresponding closed position and each latch in the first set of one or more latches is in the corresponding latched state, the first set of one or more latches releases the first movable access control element when the first movable access control element is in the corresponding closed position and each latch in the first set of one or more latches is caused to transition from the corresponding latched state to the corresponding unlatched state, the second set of one or more latches secures the second movable access control element when the second movable access control element is in a corresponding closed position and each latch in the second set of one or more latches is in the corresponding latched state, the second set of one or more latches releases the second movable access control element when the second movable access control element is in the corresponding closed position and each latch in the second set of one or more latches is caused to transition from the corresponding latched state to the corresponding unlatched state, a first movable actuator of the two or more movable actuators is configured to cause each latch in the first set of one or more latches to transition from the corresponding latched state to the corresponding unlatched state when the first movable actuator is caused to move from the corresponding first position to the corresponding second position, and a second movable actuator of the two or more movable actuators is configured to cause each latch in the second set of one or more latches to transition from the corresponding latched state to the corresponding unlatched state when the second movable actuator is caused to move from the corresponding first position to the corresponding second position.

* * * * *